(12) United States Patent
Liu et al.

(10) Patent No.: US 9,904,945 B2
(45) Date of Patent: Feb. 27, 2018

(54) BUSINESS CHANNEL SYNCHRONIZATION

(71) Applicant: eBay Inc., San Jose, CA (US)

(72) Inventors: Allen Yihren Liu, San Francisco, CA (US); Philip J. King, San Mateo, CA (US); Michael Maffeo, San Jose, CA (US); Hemant V. Tamhanker, Milpitas, CA (US); Ajay K. Agrawal, Cupertino, CA (US)

(73) Assignee: eBay Inc., San Jose, CA (US)

( * ) Notice: Subject to any disclaimer, the term of this patent is extended or adjusted under 35 U.S.C. 154(b) by 760 days.

(21) Appl. No.: 14/445,381

(22) Filed: Jul. 29, 2014

(65) Prior Publication Data

US 2014/0337154 A1 Nov. 13, 2014

Related U.S. Application Data

(63) Continuation of application No. 11/566,117, filed on Dec. 1, 2006, now Pat. No. 8,799,218.

(51) Int. Cl.
*G06F 17/30* (2006.01)
*G06Q 30/06* (2012.01)
*G06Q 10/10* (2012.01)

(52) U.S. Cl.
CPC ... *G06Q 30/0601* (2013.01); *G06F 17/30867* (2013.01); *G06Q 10/10* (2013.01)

(58) Field of Classification Search
CPC .................................................. G06Q 30/0601
USPC ................. 707/610, 617, 618, 620; 705/26.3
See application file for complete search history.

(56) References Cited

U.S. PATENT DOCUMENTS

| | | | |
|---|---|---|---|
| 4,118,788 A | 10/1978 | Roberts | |
| 4,255,796 A | 3/1981 | Gabbe et al. | |
| 4,984,155 A | 1/1991 | Geier et al. | |
| 5,231,566 A | 7/1993 | Blutinger | |

(Continued)

FOREIGN PATENT DOCUMENTS

WO   WO-2002019220 A2   3/2002

OTHER PUBLICATIONS

Article entitled "Now-Available—eBay Blackthorne (formerly known as Seller's Assistant", by Nino, dated Oct. 20, 2005.*

(Continued)

*Primary Examiner* — Mahesh Dwivedi
(74) *Attorney, Agent, or Firm* — Schwegman Lundberg & Woessner, P.A.

(57) ABSTRACT

A method and a system of business channel synchronization are provided. In one example embodiment, a network-based commerce system may receive, via a network and from a client application, update data related to a user listing, update a record related to the user listing, utilizing the received update data; and communicate, via the network, the received update data reflecting a further update to the record related to the user listing to the client application. In one example embodiment, a client system may comprise a communication module, a listing manager, a synchronization engine, an upload module, and a user interface module. In one example embodiment, a user may synchronize the user's listing data from a client application to one or more network-based commerce systems. In an alternative example embodiment the user may synchronize the user's listing data from one or more network-based commerce systems to a client application.

19 Claims, 18 Drawing Sheets

(56) References Cited

U.S. PATENT DOCUMENTS

| | | | |
|---|---|---|---|
| 5,392,428 A | 2/1995 | Robins | |
| 5,734,931 A | 3/1998 | Inoue et al. | |
| 5,771,003 A | 6/1998 | Seymour | |
| 6,347,339 B1* | 2/2002 | Morris | H04L 43/0811 709/224 |
| 6,549,922 B1 | 4/2003 | Srivastava et al. | |
| 6,701,314 B1 | 3/2004 | Conover et al. | |
| 8,799,218 B2 | 8/2014 | Liu et al. | |
| 9,092,792 B2 | 7/2015 | Veres et al. | |
| 2001/0039524 A1 | 11/2001 | Harrison, Jr. et al. | |
| 2002/0016831 A1 | 2/2002 | Peled et al. | |
| 2002/0035595 A1 | 3/2002 | Yen et al. | |
| 2002/0095462 A1 | 7/2002 | Beck et al. | |
| 2002/0147656 A1 | 10/2002 | Tam et al. | |
| 2002/0147790 A1 | 10/2002 | Snow | |
| 2003/0041014 A1 | 2/2003 | Grey et al. | |
| 2003/0061306 A1* | 3/2003 | Kanno | H04L 63/101 709/217 |
| 2003/0069829 A1 | 4/2003 | Gathman et al. | |
| 2003/0165160 A1* | 9/2003 | Minami | H04L 29/06 370/466 |
| 2003/0229544 A1* | 12/2003 | Veres | G06Q 10/1093 705/14.69 |
| 2004/0128224 A1 | 7/2004 | Dabney et al. | |
| 2004/0254853 A1 | 12/2004 | Heene et al. | |
| 2005/0033655 A1 | 2/2005 | Woolston | |
| 2005/0102328 A1 | 5/2005 | Ring et al. | |
| 2005/0108380 A1 | 5/2005 | Odhner et al. | |
| 2005/0203673 A1* | 9/2005 | El-Hajj | G07C 5/008 701/1 |
| 2006/0047824 A1* | 3/2006 | Bowler | H04L 63/0236 709/229 |
| 2006/0059246 A1* | 3/2006 | Grove | H04L 67/2804 709/219 |
| 2007/0039025 A1* | 2/2007 | Kraft | H04N 7/147 725/62 |
| 2007/0083612 A1* | 4/2007 | Kim | H04L 67/1095 709/217 |
| 2007/0088838 A1* | 4/2007 | Levkovitz | G06Q 30/02 709/228 |
| 2008/0043774 A1* | 2/2008 | Achtermann | H04L 67/06 370/464 |
| 2008/0133612 A1 | 6/2008 | Liu et al. | |
| 2014/0297459 A1 | 10/2014 | Boone et al. | |
| 2014/0297461 A1 | 10/2014 | Boone et al. | |
| 2014/0297462 A1 | 10/2014 | Boone et al. | |
| 2014/0297463 A1 | 10/2014 | Boone et al. | |
| 2014/0297464 A1 | 10/2014 | Boone et al. | |
| 2014/0297475 A1 | 10/2014 | Boone et al. | |
| 2014/0297482 A1 | 10/2014 | Boone et al. | |
| 2014/0297483 A1 | 10/2014 | Boone et al. | |
| 2014/0297484 A1 | 10/2014 | Boone et al. | |
| 2014/0304120 A1 | 10/2014 | Boone et al. | |
| 2014/0324594 A1 | 10/2014 | Veres et al. | |
| 2015/0127502 A1 | 5/2015 | Knepfle et al. | |
| 2015/0371322 A1 | 12/2015 | Veres et al. | |

OTHER PUBLICATIONS

Article entitled "Ebay Blackthorne: The official Guide", by Blackthorne, publically available in the United States on Oct. 20, 2005.*

Article entitled "Turbo Lister Listing Activity Quick Start Guide", by eBay, dated Apr. 2007.*

Article entitled "NEW eBay Turbo Lister 2 Quick Start Guide", by eBay, dated Feb. 2006.*

Article entitled Robocopy.exe Robust File Copy Utility Version XP010, Copyright 2003.*

"U.S. Appl. No. 10/252,129, Non Final Office Action dated Nov. 20, 2015", 35 pgs.

"U.S. Appl. No. 14/231,613, Non Final Office Action dated Jun. 3, 2016", 20 pgs.

"U.S. Appl. No. 14/231,624, Final Office Action dated Oct. 22, 2015", 28 pgs.

"U.S. Appl. No. 14/231,624, Non Final Office Action dated Feb. 23, 2016", 36 pgs.

"U.S. Appl. No. 14/231,624, Response filed Dec. 10, 2015 to Final Office Action dated Oct. 22, 2015", 15 pgs.

"U.S. Appl. No. 14/231,633, Final Office Action dated Oct. 16, 2015", 25 pgs.

"U.S. Appl. No. 14/231,633, Non Final Office Action dated Apr. 22, 2016", 35 pgs.

"U.S. Appl. No. 14/231,633, Response filed Dec. 10, 2015 to Final Office Action dated Oct. 16, 2015", 14 pgs.

"U.S. Appl. No. 14/231,639, Final Office Action dated Oct. 23, 2015", 28 pgs.

"U.S. Appl. No. 14/231,639, Non Final Office Action dated Feb. 23, 2016", 36 pgs.

"U.S. Appl. No. 14/231,639, Response filed Dec. 10, 2015 to Final Office Action dated Oct. 23, 2015", 14 pgs.

"U.S. Appl. No. 14/231,650, Examiner Interview Summary dated Mar. 25, 2016", 3 pgs.

"U.S. Appl. No. 14/231,650, Final Office Action dated Oct. 23, 2015", 28 pgs.

"U.S. Appl. No. 14/231,650, Non Final Office Action dated Mar. 25, 2016", 34 pgs.

"U.S. Appl. No. 14/231,650, Response filed Dec. 10, 2015 to Final Office Action dated Oct. 23, 2015", 15 pgs.

"U.S. Appl. No. 14/231,684, Final Office Action dated Oct. 28, 2015", 26 pgs.

"U.S. Appl. No. 14/231,684, Non Final Office Action dated Feb. 10, 2016", 31 pgs.

"U.S. Appl. No. 14/231,684, Response filed Dec. 16, 2015 to Final Office Action dated Oct. 28, 2015", 12 pgs.

"U.S. Appl. No. 14/231,696, Final Office Action dated Feb. 8, 2016", 31 pgs.

"U.S. Appl. No. 14/231,696, Non Final Office Action dated Oct. 22, 2015", 29 pgs.

"U.S. Appl. No. 14/231,696, Response filed Dec. 10, 2015 to Non Final Office Action dated Oct. 22, 2015", 15 pgs.

"U.S. Appl. No. 14/231,706, Final Office Action dated Oct. 14, 2015", 29 pgs.

"U.S. Appl. No. 14/231,706, Non Final Office Action dated Feb. 11, 2016", 32 pgs.

"U.S. Appl. No. 14/231,706, Response filed Dec. 10, 2015 to Final Office Action dated Oct. 14, 2015", 14 pgs.

"U.S. Appl. No. 14/231,719, Final Office Action dated Feb. 9, 2016", 32 pgs.

"U.S. Appl. No. 14/231,719, Non Final Office Action dated Nov. 19, 2015", 25 pgs.

"U.S. Appl. No. 14/231,719, Response filed Dec. 16, 2015 to Non Final Office Action dated Nov. 19, 2015", 14 pgs.

"U.S. Appl. No. 14/231,722, Final Office Action dated Oct. 21, 2015", 26 pgs.

"U.S. Appl. No. 14/231,722, Non Final Office Action dated Feb. 9, 2016", 32 pgs.

"U.S. Appl. No. 14/231,722, Response filed Jun. 6, 2016 to Non Final Office Action dated Feb. 9, 2016", 15 pgs.

"U.S. Appl. No. 14/231,722, Response filed Dec. 10, 2015 to Final Office Action dated Oct. 21, 2015", 14 pgs.

"U.S. Appl. No. 14/268,986, Final Office Action dated Dec. 3, 2015", 13 pgs.

"U.S. Appl. No. 14/268,986, Non Final Office Action dated Jun. 17, 2016", 17 pgs.

"U.S. Appl. No. 14/268,986, Response filed Apr. 4, 2016 to Final Office Action dated Dec. 3, 2016", 21 pgs.

"U.S. Appl. No. 14/595,074, Final Office Action dated Jan. 14, 2016", 10 pgs.

"Indian Application Serial No. 1200/KOLNP/2009, First Examiner Report dated Nov. 23, 2015", in English, 2 pgs.

"Indian Application Serial No. 1200/KOLNP/2009, Response filed Jun. 13, 2016 to First Examiner Report dated Nov. 23, 2015", in English, 19 pgs.

"U.S. Appl. No. 14/231,624, Response filed Jul. 7, 2016 to Non Final Office Action dated Feb. 23, 2016", 16 pgs.

(56) References Cited

OTHER PUBLICATIONS

"U.S. Appl. No. 14/231,633, Response filed Jul. 7, 2016 to Non Final Office Action dated Apr. 22, 2016", 14 pgs.
"U.S. Appl. No. 14/231,639, Response filed Jul. 7, 2016 to Non Final Office Action dated Feb. 23, 2016", 16 pgs.
"U.S. Appl. No. 14/231,650, Response filed Jul. 7, 2016 to Non Final Office dated Mar. 25, 2016", 16 pgs.
"U.S. Appl. No. 14/231,684, Response filed Jul. 7, 2016 to Non Final Office Action dated Feb. 10, 2016", 16 pgs.
"U.S. Appl. No. 14/231,696, Response filed Jul. 7, 2016 to Final Office Action dated Feb. 8, 2016", 16 pgs.
"U.S. Appl. No. 14/231,706, Response filed Jul. 7, 2016 to Non Final Office Action dated Feb. 11, 2016", 15 pgs.
"U.S. Appl. No. 14/231,719, Response filed Jul. 5, 2016 to Final Office Action dated Feb. 9, 2016", 16 pgs.
"U.S. Appl. No. 14/231,722, Final Office Action dated Aug. 3, 2016", 33 pgs.
"U.S. Appl. No. 10/252,129, Examiner Interview Summary dated May 15, 2015", 3 pgs.
"U.S. Appl. No. 10/252,129, Final Office Action dated Apr. 22, 2015", 35 pgs.
"U.S. Appl. No. 10/252,129, Response filed Jul. 10, 2015 to Final Office Action dated Apr. 22, 2015", 21 pgs.
"U.S. Appl. No. 13/285,916, Examiner Interview Summary dated Jan. 22, 2015", 3 pgs.
"U.S. Appl. No. 13/285,916, Notice of Allowance dated Mar. 3, 2015", 5 pgs.
"U.S. Appl. No. 13/285,916, PTO Response to Rule 312 Communication dated Jun. 9, 2015", 2 pgs.
"U.S. Appl. No. 13/285,916, Response filed Jan. 30, 2015 to Non Final Office Action dated Oct. 30, 2014", 22 pgs.
"U.S. Appl. No. 13/285,916, Supplemental Notice of Allowability dated Apr. 1, 2015", 4 pgs.
"U.S. Appl. No. 13/285,916, Supplemental Notice of Allowability dated Jun. 18, 2015", 4 pgs.
"U.S. Appl. No. 14/231,624, Non Final Office Action dated May 22, 2015", 19 pgs.
"U.S. Appl. No. 14/231,624, Response filed Aug. 22, 2015 to Non Final Office Action dated May 22, 2015", 12 pgs.
"U.S. Appl. No. 14/231,633, Non Final Office Action dated Mar. 24, 2015", 16 pgs.
"U.S. Appl. No. 14/231,633, Response filed Aug. 5, 2015 to Non Final Office Action dated Mar. 24, 2015", 11 pgs.
"U.S. Appl. No. 14/231,639, Non Final Office Action dated Jul. 16, 2015", 19 pgs.
"U.S. Appl. No. 14/231,639, Response filed Aug. 25, 2015 to Non Final Office Action dated Jul. 16, 2015", 14 pgs.
"U.S. Appl. No. 14/231,650, Non Final Office Action dated Mar. 3, 2015", 18 pgs.
"U.S. Appl. No. 14/231,650, Response filed Aug. 3, 2015 to Non Final Office Action dated Mar. 3, 2015", 11 pgs.
"U.S. Appl. No. 14/231,684, Non Final Office Action dated Mar. 3, 2015", 16 pgs.
"U.S. Appl. No. 14/231,684, Response filed Aug. 3, 2015 to Non Final Office Action dated Mar. 3, 2015", 10 pgs.
"U.S. Appl. No. 14/231,696, Final Office Action dated Feb. 24, 2015", 22 pgs.
"U.S. Appl. No. 14/231,696, Response filed Jul. 24, 2015 to Final Office Action dated Feb. 24, 2015", 12 pgs.
"U.S. Appl. No. 14/231,706, Non Final Office Action dated Mar. 25, 2015", 15 pgs.
"U.S. Appl. No. 14/231,706, Response filed Jul. 13, 2015 to Non Final Office Action dated Mar. 25, 2015", 10 pgs.
"U.S. Appl. No. 14/231,719, Final Office Action dated Feb. 24, 2015", 16 pgs.
"U.S. Appl. No. 14/231,719, Response filed Jul. 13, 2015 to Final Office Action dated Feb. 24, 2015", 11 pgs.
"U.S. Appl. No. 14/231,722, Non Final Office Action dated Feb. 25, 2015", 13 pgs.
"U.S. Appl. No. 14/231,722, Response filed Jul. 13, 2015 to Non Final Office Action dated Feb. 25, 2015", 9 pgs.
"U.S. Appl. No. 14/268,986, Non Final Office Action dated Jul. 2, 2015", 13 pgs.
"U.S. Appl. No. 14/268,986, Response filed Oct. 2, 2015 to Non Final Office Action dated Jul. 2, 2015", 10 pgs.
"U.S. Appl. No. 14/595,074, First Office Action Interview Office Action Summary dated Jun. 22, 2015", 4 pgs.
"U.S. Appl. No. 14/595,074, Pre-Interview First Office Action dated Apr. 2, 2015", 4 pgs.
"U.S. Appl. No. 14/595,074, Preliminary Amendment filed Jan. 19, 2015", 10 pgs.
"U.S. Appl. No. 14/595,074, Response filed Jun. 2, 2015 to First Office Action Interview Pilot Program Pre-Interview dated Apr. 2, 2015", 2 pgs.
"U.S. Appl. No. 14/595,074, Response filed Aug. 24, 2015 to First Action Interview Office Action Summary dated Jun. 22, 2015", 18 pgs.
"U.S. Appl. No. 14/790,661, Preliminary Amendment filed Jul. 6, 2015", 7 pgs.
"Chinese Application Serial No. 201110049654.X, Office Action dated Jan. 4, 2015", with English translation of claims, 18 pgs.
"Chinese Application Serial No. 201110049654.X, Response filed Mar. 11, 2015", with English translation of claims, 6 pgs.
"Stamp.com Launches New iShip Service Offering to Automate Office-Based Shipping", PR Newswire, PQDialog #448531788, (Jun. 14, 2000), 5 pgs.
"Stamp.com Launches New iShip Service Offering to Automate Office-Based Shipping", PR Newswire, PQDialog #448531788, (Jun. 14, 2000), 7 pgs.
"Yahoo! Launches Yahoo! Pay-direct for Online Person-to-Person Payments; Relationship With CIBC National Bank Allows Consumers to Easily Send and Receive Payments Via Email", Business Wire, PQ Dialog #445932440, (Jul. 31, 2000), 4 pgs.
"U.S. Appl. No. 09/602,110, Final Office Action dated Sep. 10, 2014", 19 pgs.
"U.S. Appl. No. 10/252,129, Examiner Interview Summary dated Dec. 1, 2014", 3 pgs.
"U.S. Appl. No. 10/252,129, Non Final Office Action dated Sep. 23, 2014", 31 pgs.
"U.S. Appl. No. 10/252,129, Response filed Dec. 17, 2014 to Non Final Office Action dated Sep. 23, 2014", 24 pgs.
"U.S. Appl. No. 13/285,916, Non Final Office Action dated Oct. 30, 2014", 19 pgs.
"U.S. Appl. No. 14/231,696, Non Final Office Action dated Jul. 31, 2014", 18 pgs.
"U.S. Appl. No. 14/231,696, Response filed Oct. 31, 2014 to Non Final Office Action dated Jul. 31, 2014", 23 pgs.
"U.S. Appl. No. 14/231,719, Non Final Office Action dated Aug. 14, 2014", 12 pgs.
"U.S. Appl. No. 14/231,719, Response filed Nov. 12, 2014 to Non Final Office Action dated Aug. 14, 2014", 17 pgs.
"U.S. Appl. No. 14/268,986, Notice of Non-Compliant Amendment dated Aug. 12, 2014", 3 pgs.
"U.S. Appl. No. 14/268,986, Response filed Nov. 12, 2014 to Notice of Non-Compliant Amendment dated Aug. 12, 2014", 3 pgs.
"Chinese Application Serial No. 201110049654.X, Office Action dated Jul. 10, 2014", with English translation, 18 pgs.
"Chinese Application Serial No. 201110049654.X, Office Action dated Sep. 10, 2014", with English translation of claims, 15 pgs.
"Chinese Application Serial No. 201110049654.X, Response filed Nov. 25, 2014 to Office Action dated Sep. 10, 2014", with English translation of claims, 18 pgs.
"Stamps.com Becomes the Standard in Internet Mailing and Shipping for Top Auction Resource and Trading Sites", Stamps.com: PR Newswire Mar. 15, 2000, PQDialog #449383612, [Online]. Retrieved from the Internet: <URL: http://search.proquest.com/professional/docview/449383612?accountid=161862>, (Mar. 15, 2000), 6 pgs.
"Yahoo! Launches Yahoo! PayDirect for Online Person-to-Person Payments; Relationship with CI BC National Bank Allows Consumers to Easily Send and Receive Payments Via Email", Business Editors & High-Tech Writers. Business Wire, [Online]. Retrieved

(56) References Cited

OTHER PUBLICATIONS from the Internet: <URL: http://search.proquest.com/professional/docview/445932440?accountid=161862>, (Jul. 31, 2000), 4 pgs.
"U.S. Appl. No. 14/231,613 Examiner Interview Summary dated Nov. 3, 2016", 3 pgs.
"U.S. Appl. No. 14/231,613, Final Office Action dated Nov. 3, 2016", 27 pgs.
"U.S. Appl. No. 14/231,613, Response filed Sep. 28, 2016 to Non Final Office Action dated Jun. 3, 2016", 17 pgs.
"U.S. Appl. No. 14/231,624, Decision on Pre-Appeal Brief dated Dec. 8, 2016", 2 pgs.
"U.S. Appl. No. 14/231,624, Final Office Action dated Aug. 31, 2016", 28 pgs.
"U.S. Appl. No. 14/231,624, Pre Appeal Brief Request filed Oct. 28, 2016", 6 pgs.
"U.S. Appl. No. 14/231,624, Supplemental Amendment filed Aug. 23, 2016", 7 pgs.
"U.S. Appl. No. 14/231,633 Supplemental Amendment filed on Aug. 17, 2016", 9 pgs.
"U.S. Appl. No. 14/231,633, Decision on Pre-Appeal Brief dated Nov. 10, 2016", 2 pgs.
"U.S. Appl. No. 14/231,633, Final Office Action dated Aug. 24, 2016", 28 pgs.
"U.S. Appl. No. 14/231,633, Pre-Appeal Brief Request filed Oct. 5, 2016", 6 pgs.
"U.S. Appl. No. 14/231,639 Supplemental Amendment filed on Aug. 17, 2016", 8 pgs.
"U.S. Appl. No. 14/231,639, Decision on Pre-Appeal Brief dated Dec. 9, 2016", 2 pgs.
"U.S. Appl. No. 14/231,639, Final Office Action dated Aug. 26, 2016", 28 pgs.
"U.S. Appl. No. 14/231,639, Pre Appeal Brief Request filed Oct. 28, 2016".
"U.S. Appl. No. 14/231,650, Decision on Pre-Appeal Brief dated Dec. 8, 2016", 2 pgs.
"U.S. Appl. No. 14/231,650, Final Office Action dated Aug. 31, 2016", 28 pgs.
"U.S. Appl. No. 14/231,650, Pre-Appeal Brief Request filed Oct. 28, 2016", 6 pgs.
"U.S. Appl. No. 14/231,650, Supplemental Amendment filed Aug. 23, 2016", 8 pgs.
"U.S. Appl. No. 14/231,684, Decision on Pre-Appeal Brief dated Dec. 8, 2016", 2 pgs.
"U.S. Appl. No. 14/231,684, Final Office Action dated Aug. 31, 2016", 29 pgs.
"U.S. Appl. No. 14/231,684, Pre-Appeal Brief Request filed Oct. 28, 2016", 6 pgs.
"U.S. Appl. No. 14/231,684, Supplemental Amendment filed Aug. 23, 2016", 8 pgs.
"U.S. Appl. No. 14/231,696 Supplemental Amendment filed on Aug. 16, 2016", 9 pgs.
"U.S. Appl. No. 14/231,696, Decision on Pre-Appeal Brief Request dated Nov. 10, 2016", 2 pgs.
"U.S. Appl. No. 14/231,696, Non Final Office Action dated Aug. 23, 2016", 28 pgs.
"U.S. Appl. No. 14/231,696, Pre Appeal Brief Request for Review filed Oct. 13, 2016", 5 pgs.
"U.S. Appl. No. 14/231,706, Decision on Pre-Appeal Brief dated Dec. 8, 2016", 2 pgs.
"U.S. Appl. No. 14/231,706, Final Office Action dated Sep. 1, 2016", 28 pgs.
"U.S. Appl. No. 14/231,706, Pre Appeal Brief Request filed Oct. 28, 2016", 6 pgs.
"U.S. Appl. No. 14/231,706, Supplemental Amendment filed Aug. 23, 2016", 7 pgs.
"U.S. Appl. No. 14/231,719, Decision on Pre-Appeal Brief Request dated Nov. 10, 2016", 2 pgs.
"U.S. Appl. No. 14/231,719, Non Final Office Action dated Aug. 12, 2016", 33 pgs.
"U.S. Appl. No. 14/231,719, Pre Appeal Brief Request for Review field Oct. 13, 2016", 5 pgs.
"U.S. Appl. No. 14/231,722, Decision on Pre-Appeal Brief Request dated Nov. 9, 2016", 2 pgs.
"U.S. Appl. No. 14/231,722, Pre-Appeal Brief Request filed Oct. 3, 2016", 6 pgs.
"U.S. Appl. No. 14/268,986, Examiner Interview Summary dated May 12, 2017", 3 pgs.
"U.S. Appl. No. 14/268,986, Examiner Interview Summary dated Sep. 16, 2016", 3 pgs.
"U.S. Appl. No. 14/268,986, Non Final Office Action dated Feb. 10, 2017", 18 pgs.
"U.S. Appl. No. 14/268,986, Response filed May 10, 2017 to Non Final Office Action dated Feb. 10, 2017", 30 pgs.
"U.S. Appl. No. 14/268,986, Response filed Sep. 19, 2016 to Non Final Office Action dated Jun. 17, 2016", 24 pgs.
"U.S. Appl. No. 14/790,661, First Action Interview—Pre-Interview Communication dated May 18, 2017", 4 pgs.
"U.S. Appl. No. 11/566,117, Advisory Action dated Jun. 24, 2009", 3 pgs.
"U.S. Appl. No. 11/566,117, Corrected Notice of Allowance dated Jun. 27, 2017", 5 pgs.
"U.S. Appl. No. 11/566,117, Examiner Interview Summary dated May 14, 2009", 2 pgs.
"U.S. Appl. No. 11/566,117, Final Office Action dated Mar. 19, 2010", 18 pgs.
"U.S. Appl. No. 11/566,117, Final Office Action dated Apr. 5, 2011", 23 pgs.
"U.S. Appl. No. 11/566,117, Final Office Action dated Apr. 16, 2009", 17 pgs.
"U.S. Appl. No. 11/566,117, Final Office Action dated Jul. 1, 2013", 53 pgs.
"U.S. Appl. No. 11/566,117, Non Final Office Action dated Sep. 19, 2012", 44 pgs.
"U.S. Appl. No. 11/566,117, Non-Final Office Action dated Jul. 22, 2010", 17 pgs.
"U.S. Appl. No. 11/566,117, Non-Final Office Action dated Aug. 21, 2009", 19 pgs.
"U.S. Appl. No. 11/566,117, Non-Final Office Action dated Oct. 3, 2008", OARN, 18 pgs.
"U.S. Appl. No. 11/566,117, Notice of Allowance dated Mar. 20, 2014", 11 pgs.
"U.S. Appl. No. 11/566,117, Office Action dated Jan. 22, 2014", 5 pgs.
"U.S. Appl. No. 11/566,117, Preliminary Amendment filed Mar. 20, 2007", 3 pgs.
"U.S. Appl. No. 11/566,117, Response filed Jan. 13, 2011 to Non-Final Office Action dated Jul. 22, 2010", 11 pgs.
"U.S. Appl. No. 11/566,117, Response filed Jan. 22, 2013 to Non Final Office Action dated Sep. 19, 2012", 14 pgs.
"U.S. Appl. No. 11/566,117, Response filed Feb. 3, 2009 to Non-Final Office Action dated Oct. 3, 2009", 11 pgs.
"U.S. Appl. No. 11/566,117, Response filed Feb. 24, 2014 to Office Action dated Jan. 22, 2014", 4 pgs.
"U.S. Appl. No. 11/566,117, Response filed May 25, 2011 to Final Office Action dated Apr. 5, 2011", 13 pgs.
"U.S. Appl. No. 11/566,117, Response filed Jun. 3, 2009 to Final Office Action dated Apr. 16, 2009", 11 pgs.
"U.S. Appl. No. 11/566,117, Response filed Jun. 21, 2010 to Final Office Action dated Mar. 19, 2010", 12 pgs.
"U.S. Appl. No. 11/566,117, Response filed Nov. 1, 2013 to Final Office Action dated Jul. 1, 2013", 13 pgs.
"U.S. Appl. No. 11/566,117, Response filed Nov. 11, 2009 to Non Final Office Action dated Aug. 21, 2009", 11 pgs.
Blackthorne, "Ebay Blackthorne: The Official Guide", (Oct. 10, 2005), 361 pgs.
Nino, "eBay Blackthorne", (Oct. 10, 2005), 3 pgs.

* cited by examiner

BUSINESS CHANNEL SYNCHRONIZATION

CROSS-REFERENCE TO RELATED APPLICATIONS

This application is a continuation of prior application Ser. No. 11/566,117, filed on Dec. 1, 2006, which is incorporated by reference herein in its entirety.

TECHNICAL FIELD

The present application relates generally to the technical field of data processing and, in one specific example, to business channel synchronization in network based commerce systems.

BACKGROUND

In typical networked-based publication systems, a buyer can enter a commerce system's web-site and from the listings published in the web-site, select a desired listing and participate, if the listing is on auction, in the bidding process. The bidding process starts by entering the website and watching the last bid before deciding to bid on a specific listing. In other words, buyers typically interact with the commerce system through the website and are able to see, on any listing, the latest updates uploaded by the seller.

Sellers may have access to other tools provided by the networked-based commerce systems in the form of offline client applications. An example of such a client application is eBay Turbo Lister. Using these offline tools, sellers can introduce new listings by entering information on a specific listing, such as: listing description, start price, type of sale (fixed-price vs. auction), auction start time, auction duration, etc. Sellers may be able to update their online listings, from the client application. Moreover, listing revisions, for the most part, are done on a one-off basis and are manual and tedious for the user. Any entering of a new listing or editing of the existing listings does not affect the online data on the web site until it is manually uploaded by the seller to the system.

The synchronization of data between a network-based publication (or data) system and its client applications, or between a client application and multiple data or publication systems present a number of technical challenges. For example, editing of active listings directly from within the client application and having access to the latest information, as displayed on the site, from a client application.

BRIEF DESCRIPTION OF THE DRAWINGS

Some embodiments are illustrated by way of example and not limitation in the figures of the accompanying drawings in which:

FIG. 12 is a screen shot illustrating an example Active Listings view of a client application window related to a real time synchronization;

FIG. 13 is a screen shot illustrating an example active listings view of a client application window related to scheduled synchronization;

DETAILED DESCRIPTION

Example methods and systems to synchronize the data between a server system and its client applications, or between a client application and multiple server systems are described. In the following description, for purposes of explanation, numerous specific details are set forth in order to provide a thorough understanding of example embodiments. It will be evident, however, to one skilled in the art that the present invention may be practiced without these specific details.

A method and a system of business channel synchronization are provided. In one example embodiment, a networked system (e.g., network-based commerce system or a network-base publication system) may receive, via a network and from a client application, update data related to a user listing, update a record related to the user listing, utilizing the received update data; and communicate, via the network, an update data reflecting a further update to the record related to the user listing to the client application.

In one example embodiment, a user may synchronize the user's listing data from a client application to one or more network-based commerce systems. In an alternative example embodiment the user may synchronize the user's listing data from one or more network-based commerce systems to a client application.

The synchronization of the network-based commerce system with the client application enable selling managers, from a remote location, to be able to simultaneously see the information entered into the client applications by seller agents, for which they are responsible. The managers or their agents may benefit from the integration of simultaneous access to the latest information on the sales of their listings to the client application by increased efficiency.

Platform Architecture

Figure 1:
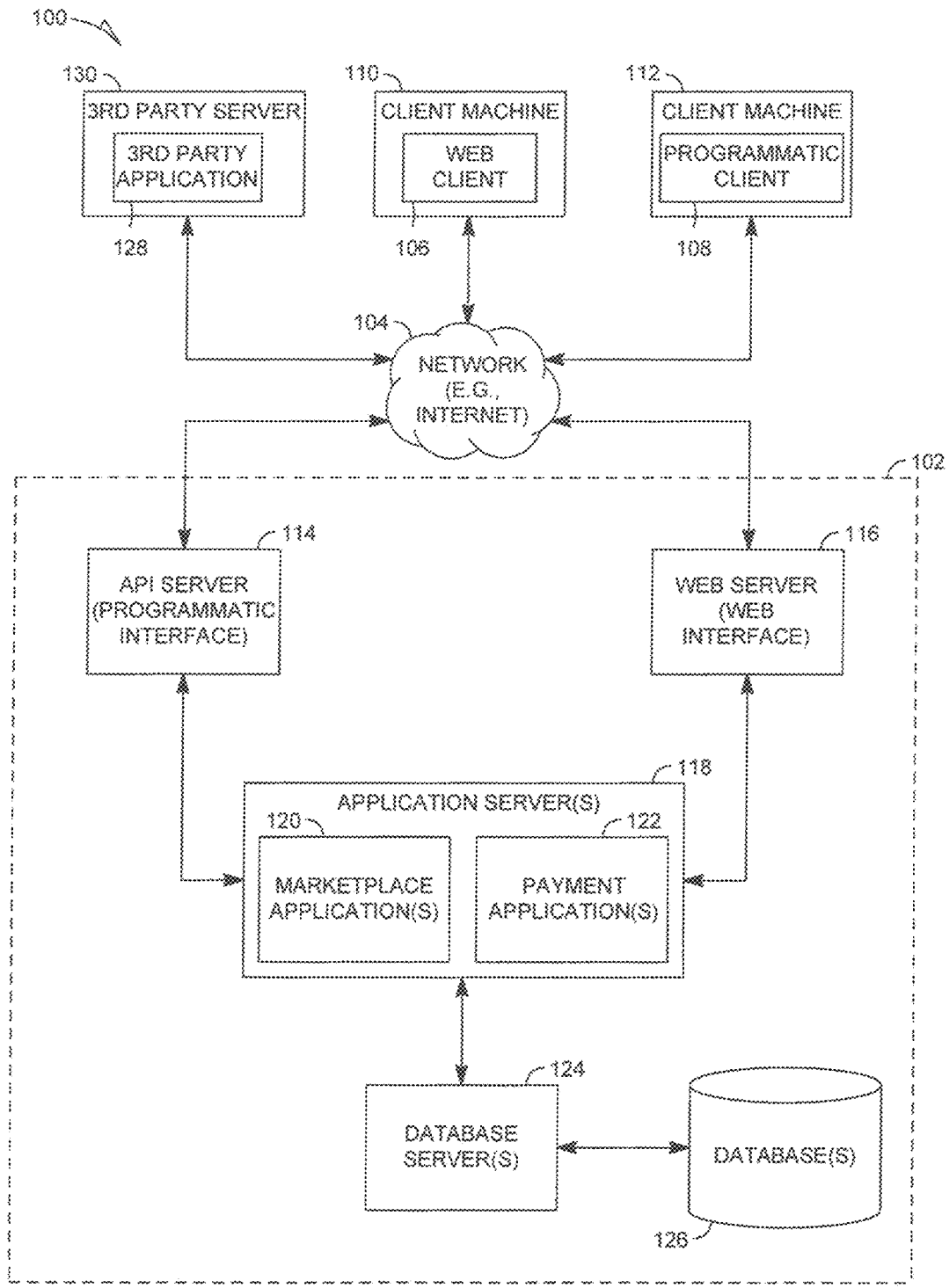
FIG. 1 is a network diagram depicting a client-server system within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the WINDOWS® INTERNET EXPLORER® browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the Turbo Lister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Marketplace Applications

Figure 2:
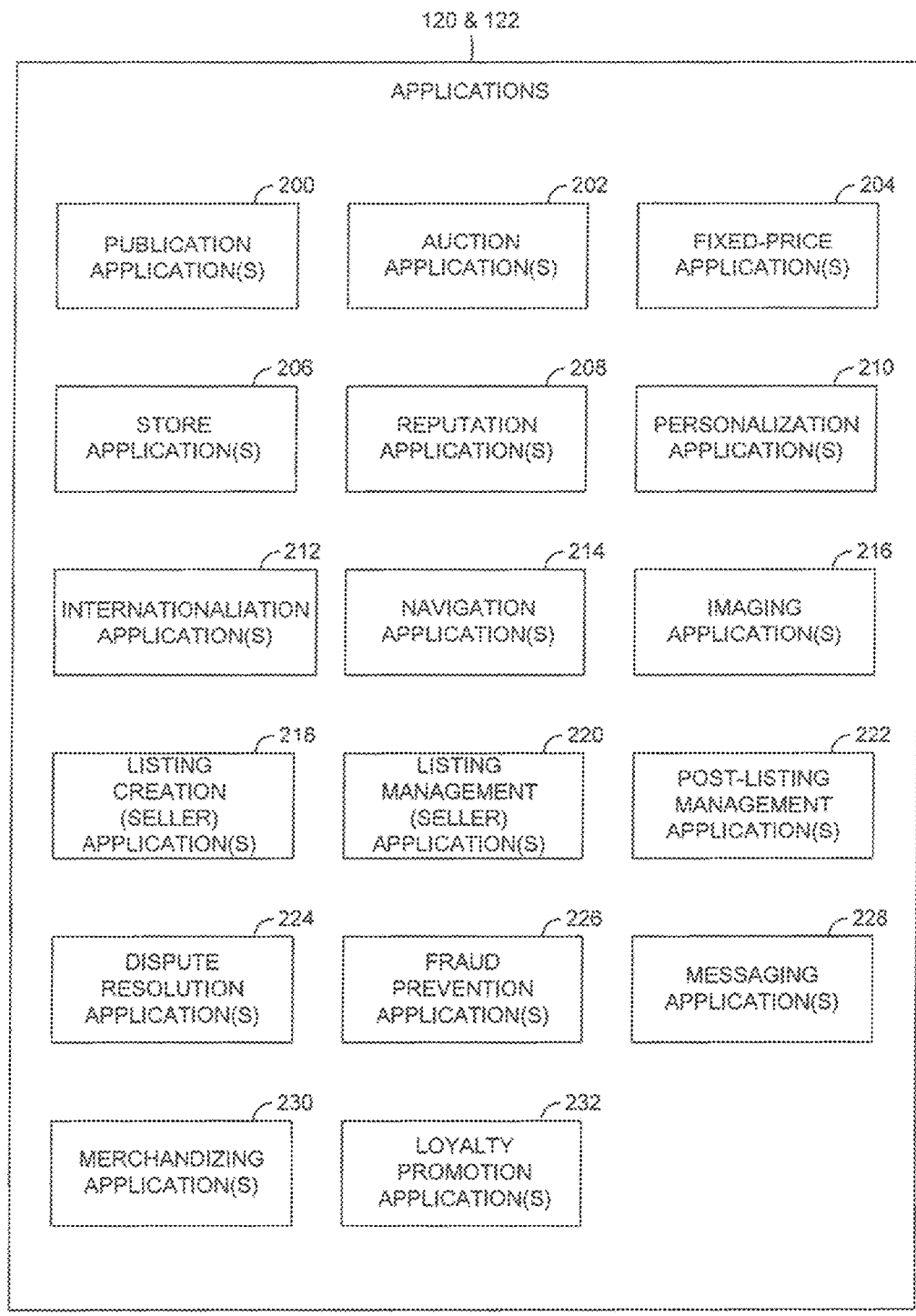
FIG. 2 is a block diagram illustrating multiple applications that, in one example embodiment are provided as part of the networked system.

FIG. 2 is a block diagram illustrating multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more database(s) 126 via the database server(s) 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 (also referred to as "listing management module") allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur as post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and may be offered a reward for which accumulated loyalty points can be redeemed.

Flowcharts

Figure 3:
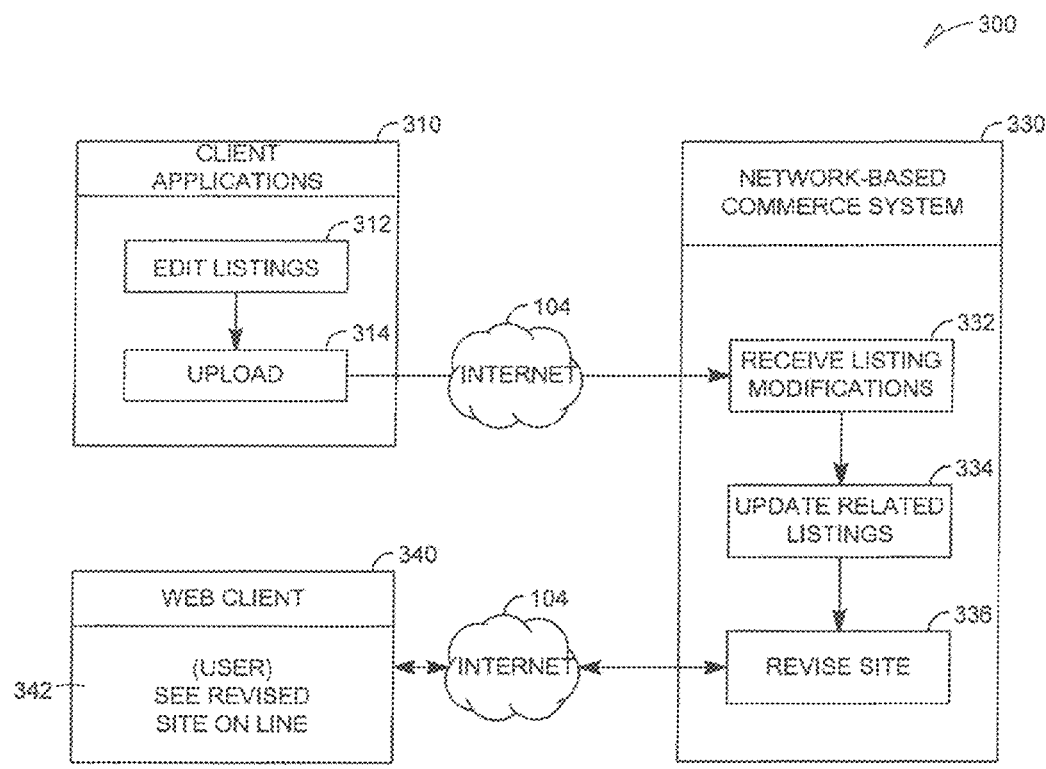
FIG. 3 is a high-level flow diagram illustrating an example embodiment of updating data related to a user listing.

FIG. 3 is a high-level flow diagram, illustrating an example embodiment of a method 300 of updating data related to a user listing. The example embodiment involves updating, by a commerce system 330, of one or more records related to a user listing, based on the data received from a client application 310 using the following operations. The client application 310 and the commerce system may communicate via the network 104 (e.g., the Internet).

From the client application 310, a user may, inter alia, create the first update data by generating new listing or modifying an existing listing (operation 312). For example, a user may edit an existing listing by modifying some of the attributes of the listing, such as extending the end date, changing asking price, etc.

The user then, from the client application 310, may upload (operation 314) the first update data to the commerce system 330 via network 104.

In example embodiments, the first update data may include a description of the user listing, a modification of the description included in the user listing, or removal of the user listing from publication by the network-based commerce system.

At operation 332, the commerce system 330 may receive the first update data from the client application 310 via network 104. Based on the received data, at operation 334, the commerce system 330 may update a first record related to the user listing. The client application 310 may have uploaded updates for more than one listing, thus at update operation 334, one or more records related to the user listing may be changed depending on the data received from the client application 310.

Figure 4:
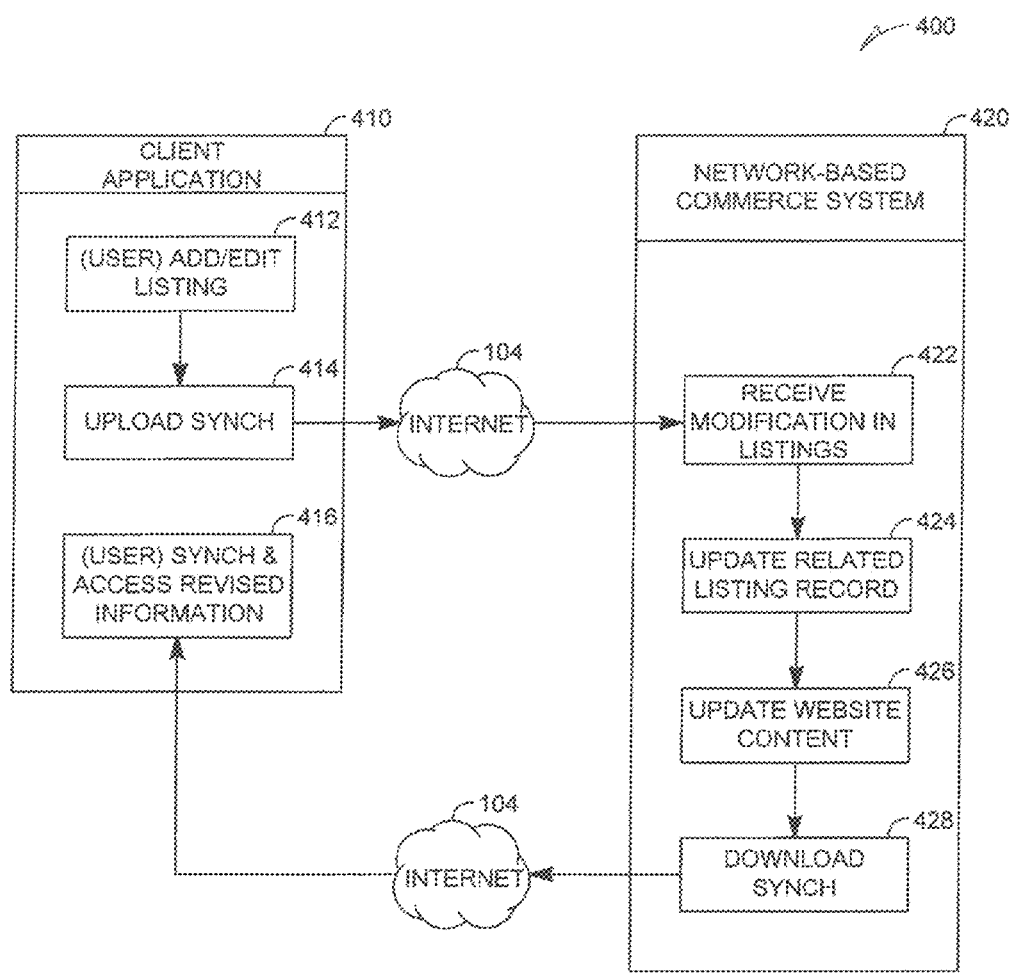
FIG. 4 is a high-level flow diagram illustrating an example embodiment of a method for synchronized updating of the data related to a user listing.

The modification or updates to the data related to the user listing may be stored in the database(s) 126 (FIG. 1) and made available online to a web client 340 via the web server 116 of FIG. 1 (operation 336). The user may then enter, via network 104, the network-base commerce system 330 using the web client 340 and through operation 342 observe the updates in the listing FIG. 4 is a high-level flow diagram, illustrating an example embodiment of a method 400 for synchronized updating of the data related to a user listing. The example method 400 involves synchronization between a client application 410 and a commerce system 420, wherein the data related to a user listing received from the client application 410 may be used to update the existing record(s) related to that listing and all changes in the commerce system 420 may be automatically reflected in data stored by the client application 410.

At operation 412, the user may use the client application 412 to introduce a new listing or create a first update (e.g., edit an existing listing and possibly modifying some of the attributes of the listing such as extending the end date, changing asking price, etc.), At operation 414, the user may use the client application 410 to upload (operation 414), via network 104, the first update data to the commerce system 420. The upload operation 414 may include a synchronization command to the commerce system 420 specifying a time for synchronization (e.g., updating one or more record(s) related to a user listing(s), based on the data uploaded via the client application) to take place.

At operation 422, the commerce system 420 may receive the first update data (e.g., listing modifications) from the client application 410, and based on that and, according to the specifics of the synchronization command, at operation 424 the commerce system 420 may update a first record related to the user listing (e.g., synchronize the commerce system 420 with client application 410).

The client application 410 may have uploaded updates for more than one listing, thus at update operation 424, one or more records related to the user listing may be changed depending on the data received from the client application 410.

The modification or updates in the data related to the user listing may be stored in the database(s) 126 (FIG. 1) and also used to alter the content of the web page associated to that listing on the commerce system 420 web site at operation 426. The page is made available online to the web clients via the web server 116 of the networked system 102 (FIG. 1).

In the example embodiment 400, the commerce system 420 may also, at a download synchronization operation 426, communicate, via the API server 114 (FIG. 1), second update data to the client application 410.

In an example embodiment, the second update data may include data related to a sale of an offering that is the subject of the user listing in an auction or as a fixed price listing. In another example embodiment, the second update data may include data related to a current bid related to the user listing offered for sale in the commerce system. In another example embodiment, the second update data may include data related to a message communicated by the client application (e.g., email messages communicated between prospect buyers or real buyers and the seller or between the commerce system and the seller).

In another example embodiment, the second update data may reflect a further update to the first record related to the user listing including updates to the data related to a user listing (e.g. changes following the synchronization of the commerce system 420 with the client application 410).

The client application 410 may receive the second update data from the API server 114, via the network 104 (e.g., the Internet), and at operation 416, update a second record related to the user listing using the second update data received from the networked-based commerce system 420. The operation 416 may include updating more than one record related to the user listing(s), depending on the updates received from the commerce system 420.

Figure 5:
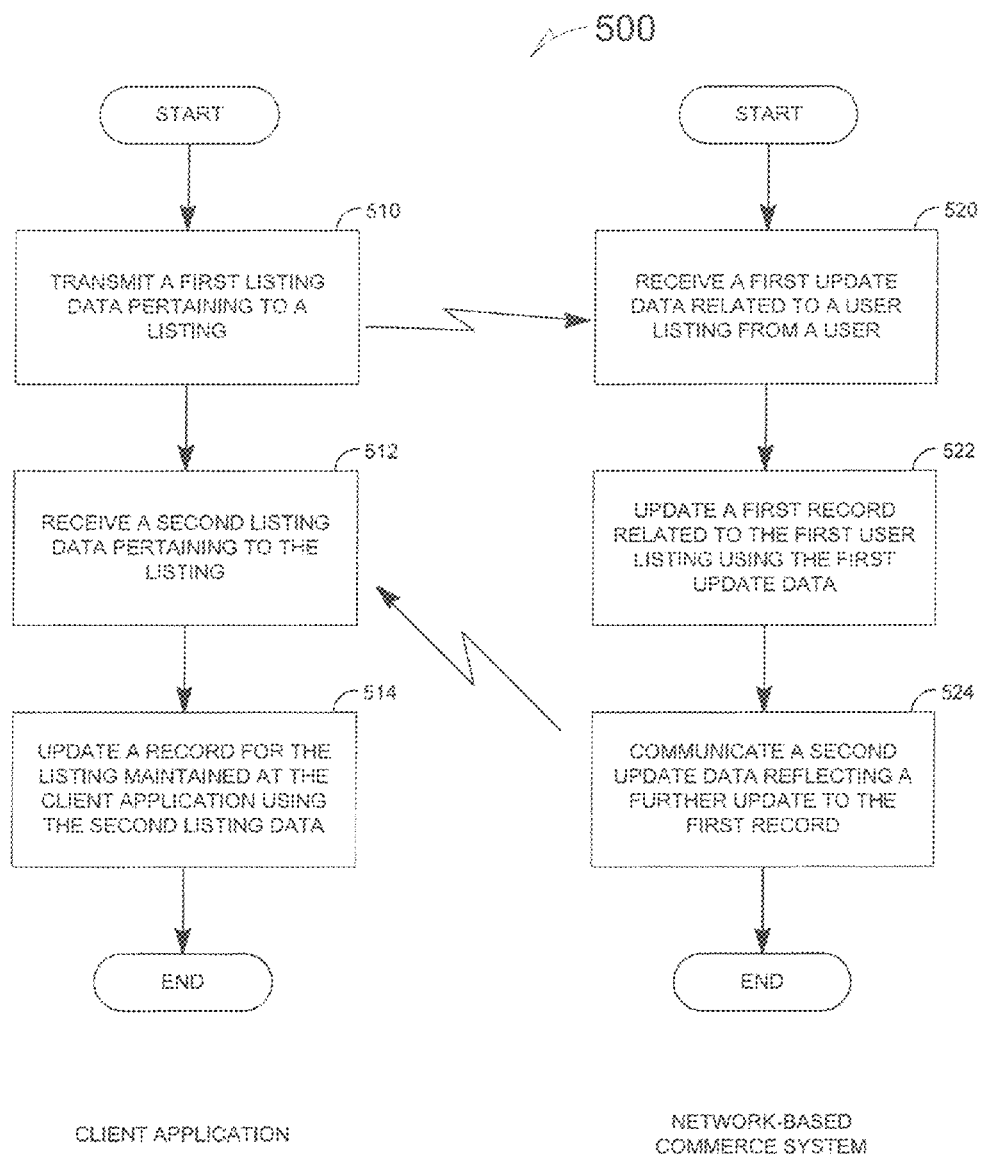
FIG. 5 is a high-level flow diagram illustrating an example embodiment of a method for client application synchronizing to a commerce system.

FIG. 5 is a high-level flow diagram, illustrating an example embodiment of a client application-commerce system synchronization process 500. At the client application side, the process 500 starts at operation 510, with the client application 410 transmitting (e.g., uploading) first listing data pertaining to a user listing to the commerce system 420 via the network 104 (e.g., the Internet). The first listing data may include revisions on an existing listing data such as modifications of some of the attributes of the listing (e.g., including but not limited to extending the end date, changing asking price, etc.).

At operation 512, a client application 420 may receive from the commerce system 420, via the network 104 (e.g., the Internet), second listing data pertaining to the listing (e.g., the update data communicated by the commerce system 420). Based on the received data from the commerce system 420, the client application 410 may update one or more records for the listing(s) maintained at the client application (operation 514). This updating may constitute synchronization of the client application 410 with commerce system 420 and may facilitate the user's access to updates on the listings without the need for logging onto the commerce system web site.

At the commerce system side, the example process 500 starts with operation 520. In this operation, the commerce system 420, receives first update data (e.g., uploaded by the client application 410 in operation 510) related to a user listings, the first update data being received via the network 104 from the client application 410. The update data may include data related to more than one listing or modification of one or more attributes of one or more listings.

At operation 522, based on the first update data received from the client application 410 in operation 520, a first record related to the first user listing update is updated at the commerce system 420. The update may involve one or more records, based on the first update data received from the client application 410, if such data pertains to more than one listing. This operation may constitute synchronization of the commerce system 420 with the client application 410.

The modification or updates in the data related to the user listing may be stored in the database(s) 126 (FIG. 1) and also used to alter the content of the web page related to that listing on the commerce system 420 web site. The synchronized listing data may be made accessible to the on line users via web server 116 of FIG. 1.

At the next operation 524, the commerce system 420 may communicate, second update data, reflecting a further update to the first record related to the user listing, to the client application 410 via the network 104. This operation may include performing updates to the data related to a user listing, including making changes following the synchronization of the commerce system 420 with the client application 410, bidding data (e.g. current bid), sales data or messages communicated by the client application, such as email messages.

Figure 6:
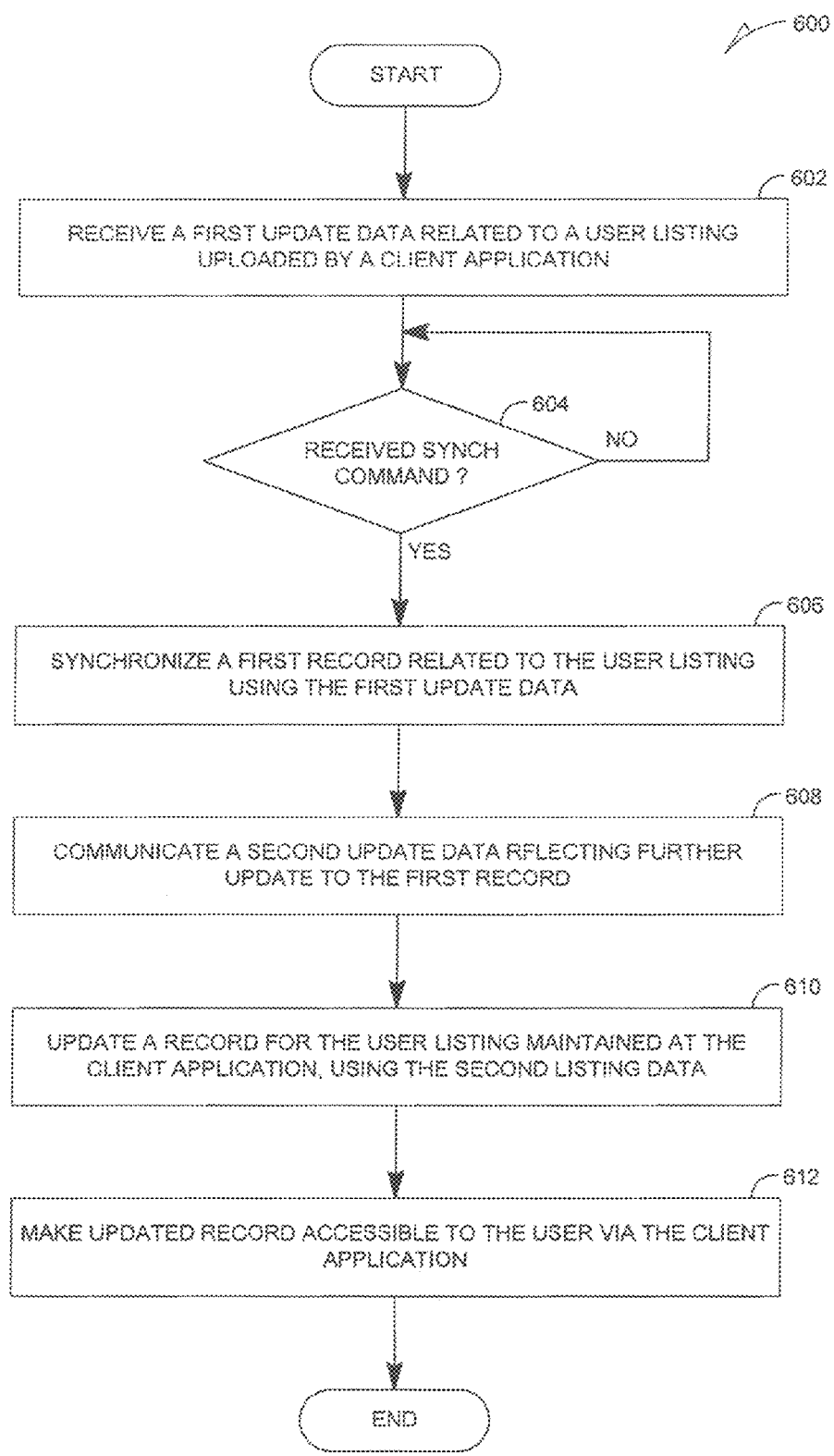
FIG. 6 is a flow diagram illustrating an example embodiment of a method for a network-base commerce system synchronizing with a client application.

FIG. 6 is a flow diagram, illustrating an example embodiment of a method 600 for a network-base commerce system to synchronize with a client application. The example method 600 includes operations 602 through 612. At operation 602, the commerce system 420 receives first update data related to a user listing uploaded by the client application 410.

At decision operation 604, the commerce system 420 may check to see whether a synchronization command has been received. If no synchronization command has been received, the commerce system 420 may wait for a synchronization command before performing any synchronization. Otherwise, if a synchronization command has been received, at operation 606, the commerce system 420 may synchronize a first record related to the first user listing using the first update data received from the client application 410 (e.g., uploaded by the client application 410 in operation 510). The update may include data related to more than one listing or modification of one or more attributes of one or more listings.

At operation 608, the commerce system 420 may communicate second update data reflecting further an update to the first record. This operation may include making updates to the data related to a user listing, including making changes following the synchronization of the commerce system 420 with the client application 410, or as result of new bids, change of status, such as listing being sold, etc.

The next operation 610 may involve updating one or more records for the user listing maintained at the client application 410, using the second listing data (e.g., the bidding data, sale of an offering that is the subject of the user listing, and messages communicated by the client application, such as email messages) communicated by the commerce system 420 to the client application 410. This operation may constitute synchronization of the client application 410 with commerce system 420. The client application 410 may make all updates accessible to the user at operation 612. This may help the user to access updates on the listings, without any extra time and effort spent logging into the commerce system 420 to see the update.

Figure 7:
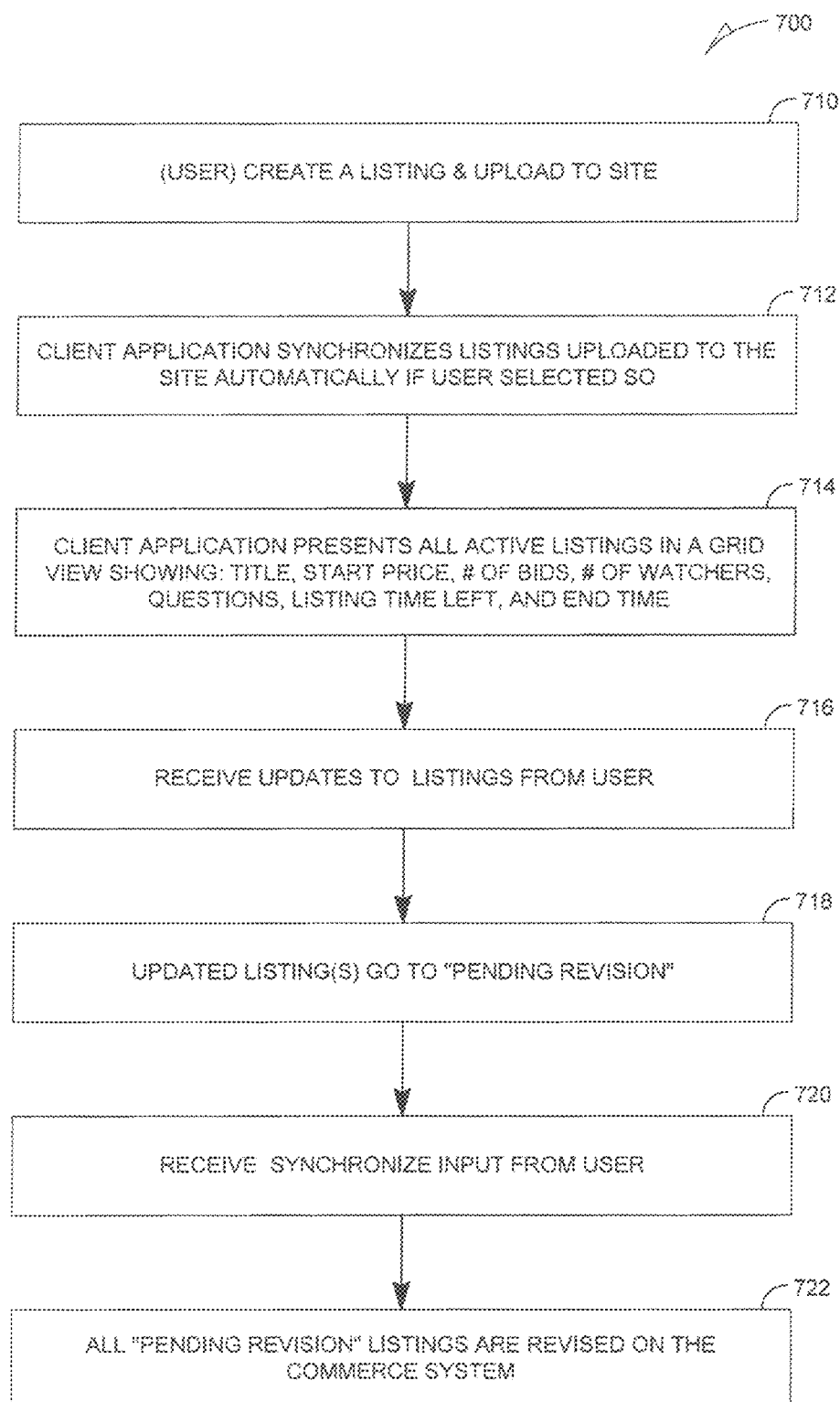
FIG. 7 is a flow diagram illustrating an example embodiment of method for a real-time client application-commerce system synchronization.

FIG. 7 is a flow diagram, illustrating an example embodiment of a method 700 for a real-time client application-commerce system synchronization. The example method 700 starts at operation 710, with a user may be creating one or more listings or modify attributes of one or more listings, and uploading such data to the commerce system 420. The uploading may include transmitting the data via the network 104 to the commerce system 420. The client application 410 may, following the upload, send a synchronization command to the commerce system 420, in order to have the commerce system 420 automatically synchronize to the uploaded data (operation 712).

At operation 714, the client application 410 presents the user with one or more active listings in a grid view showing, inter alia, title, start price, number of bids, number of watchers, questions, listing time left, and end time. From this view, the user may update any selected listings as desired (operation 716).

Figure 13:
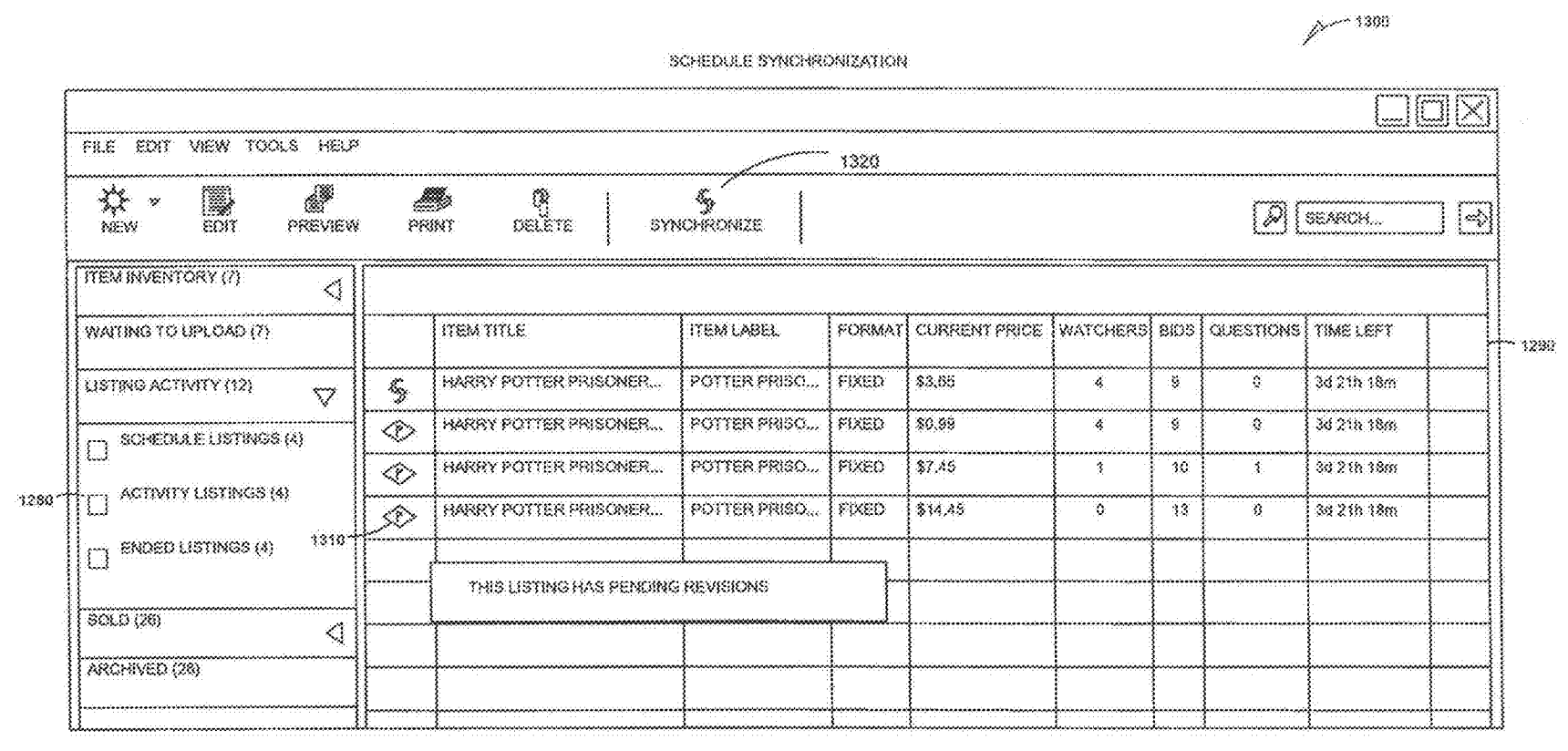

At the next operation 718, the updated listing(s) may be placed in a "pending revision" status (see FIG. 13). The user may then click on "Synchronize Now" button to synchronize, at operation 720, updated versions of listing data as stored by the web site with the revised versions of listing data as uploaded by the client application 410. This operation causes the client application 410 to send, via the network a synchronization command to the commerce system 420. Thereafter, at operation 722, the synchronization operation may be performed, and all the listings shown as pending revision may be revised on the commerce system 420.

Figure 8:
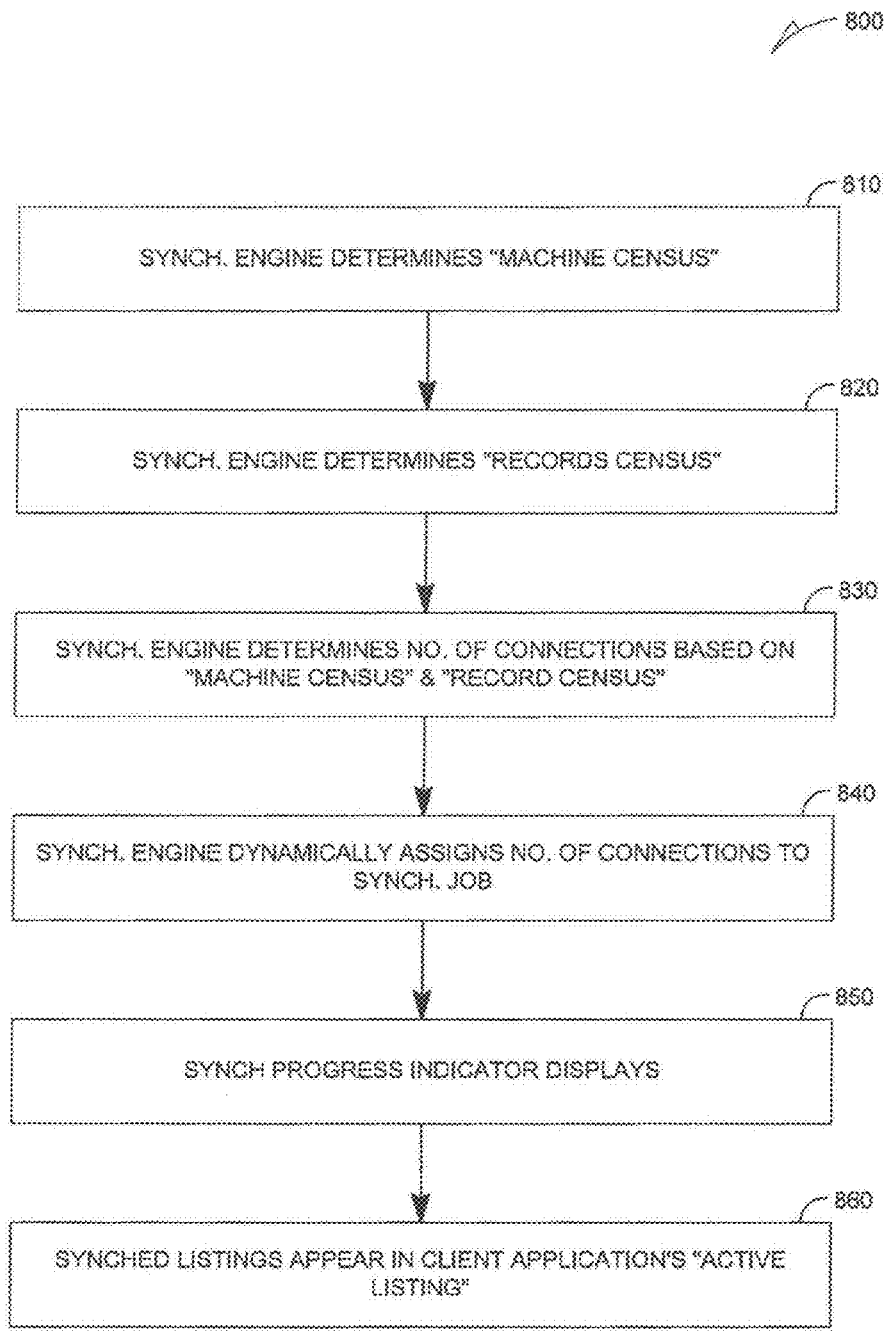
FIG. 8 is a flow diagram illustrating an example embodiment of a method for a client application-commerce system synchronization including pre-synchronization.

FIG. 8 is a flow diagram, illustrating an example embodiment of a method 800 for a client application-commerce system synchronization including pre-synchronization checks. Prior to synchronization, at operation 810, a synchronization engine (module 916 in FIG. 9 described below) may determine the Central Processing Unit (CPU) speed, total memory, available memory, bandwidth available and the operating system of the client machine. This is referred to as "machine census" (see operation 810). The synchronization engine 916 may also determine, at operation 820, the approximate number of items it needs to synchronize from both the client application 410 and the commerce system 420. This number is referred to as "records census."

At operation 830, the synchronization engine 916 may determine the number of connections it needs to open to begin the synchronization process by examining the machine and records censuses. The number of connections used may vary depending on the machine and records censuses. A matrix may be created to determine the optimal number of connections to open and at operation 840, and the synchronization engine 916 dynamically assigns the appropriate number of connections to the synchronization job. Before the initial synchronization begins, the user may be presented with the number of records that will be processed and the approximate amount of time this will take.

In the next operation 850, a synchronization process indicator may be displayed to show that the synchronization is occurring. The user may be able to see the synched listings as they appear in the client application's "Active Listings" (see operation 860).

System Architecture

Figure 9:
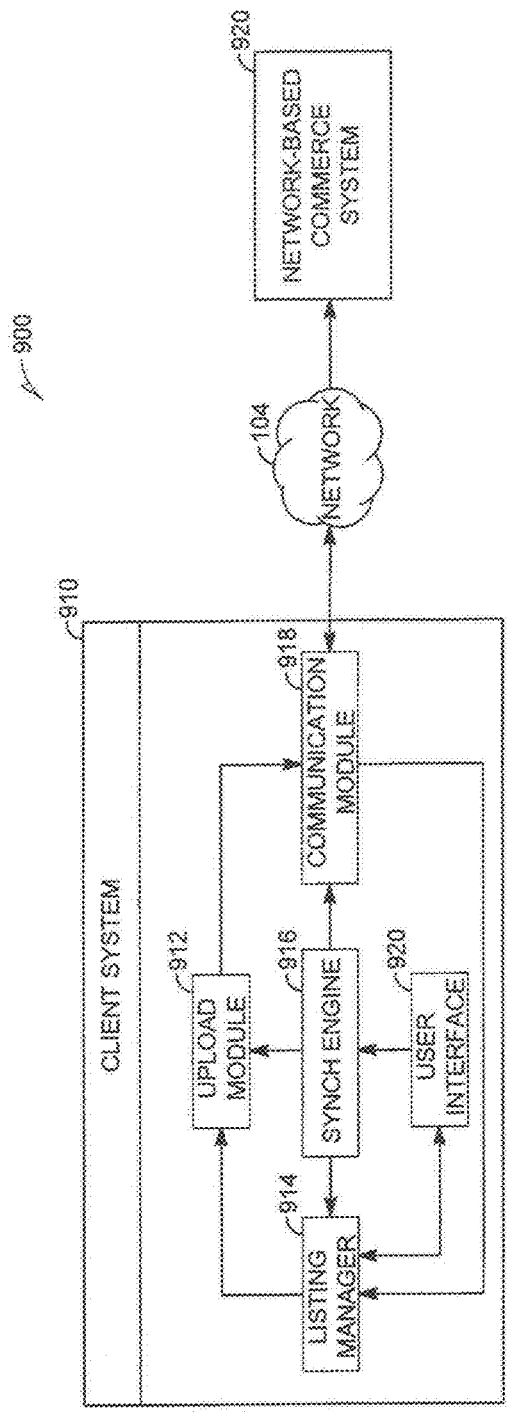
FIG. 9 is a diagrammatic representation of an example embodiment of a client system capable of synchronizing with a server system.

FIG. 9 is a diagrammatic representation of an example embodiment of a client system 910 capable of synchronizing with a commerce system. The client system 910 may synchronize with the commerce system 920 by communicating data via the network 104. The client system 910 may include a listing manager 914, an upload module 912, a synchronization engine 916, a user interface 920, and a communication module 918.

The listing manager 914 may be responsible for handling user listing information, including receiving and communicating the data within the modules in the client system 910. The listing manager 914 may receive inputs from any of the user interface 920, the communication module 918, and the synchronization module 916.

The inputs from the user interface may include new listings with their attributes (e.g., price, quantity, specification, start time, end time, etc.), any modification on the previous listings such as change in certain attributes such as end time if the listing is active, and in case the listing is not yet active, changes in any other attributes or even withdrawal of the listing from sale.

The inputs from the communication module 918 may include update data reflecting the changes in the user listing records received from the commerce system 920.

The listing manager 914 may also receive control signals from the synchronization module 916. These signals may include commands to receive updates from the communication module 918, or to transfer updates or data related to new listings to the upload module 912.

The upload module 912 may receive updates or new data related to the user listings and upon receipt of a control signal from the synchronization engine 916, it may transfer the data to the communication module 918 to be communicated, via the network 104, to the commerce system 104.

The synchronization engine 916 may play the role of a control module, receiving control inputs from the user interface 920 and sending control signals to the listing manager 914, the upload module 912, and the communication module 918. The inputs from the user interface 920 may include synchronization related data such as commands to send updates to the commerce system 920 or data related to a scheduled time for such synchronization. The input to the synchronization engine 916 may also include commands related to synchronization of the client system with the commerce system 920 (e.g., updates received from the commerce system 920).

The control signal outputs to the listing manager 914 may include commands to receive updates from the communication module 918 or to transfer updates or data related to new listings to the upload module 912. The control signal output to the upload module 912 may include commands to transfer data to the communication module. The control signal outputs to the communication module 918 may include commands to communicate data to or receive data from the commerce system 920, via the network 104.

The synchronization engine 916 may also perform other tasks, as explained under the description of FIG. 8, including performing the machine census and the records census, and dynamically assigning a number of connections to the synchronization jobs.

The communication module 918 may receive synchronization control signal from the synchronization module 916 and listing data from the upload module 912. This module 918 may communicate data, via network 104, to the commerce system 920. The communication may include transmitting user listing updates received from the upload module 912 to the commerce system 104 and receiving updates occurring at the commerce system 920 (e.g., the bidding data, sales data, and messages communicated by the client application, such as email messages) from that system. Other tasks performed by the communication module 918 may include transferring the updates received from the commerce system 920 to the listing manager 914.

Figure 10:
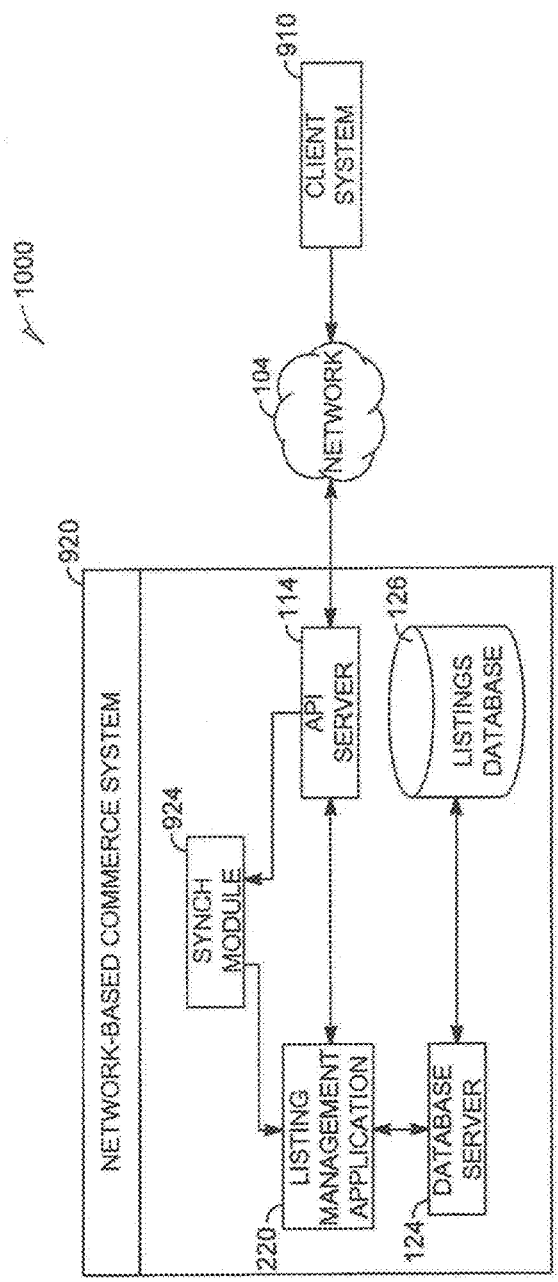
FIG. 10 is a diagrammatic representation of an example embodiment of a server system capable of synchronizing with a client application.

FIG. 10 is a block diagram 1000 of an example embodiment of a commerce system 920 capable of synchronizing with a client application. The commerce system 920 may synchronize with the client system 910 by communicating data via the network 104. The commerce system 920 may include a listing management application 220, a synchronization module 924, an API server 114, a database server 124, and a listing database 126.

The listing management application 220 may allow sellers to manage seller listings. Specifically, where a particular seller has authored and/or published a large number of listings, the management of such listings may present a challenge. The listing management applications 220 may provide a number of features (e.g., auto-relisting, inventory level monitors, etc.) to assist the seller in managing such listings.

In the context of the example commerce system representation 920, the listing management application 220 may receive update data from the API server 114 and control signals from the synchronization module 924. It may also receive data from the database server 124. The update data received from the API server 114 may include data received, via the network 104, from the client application 910. The control signal received by the listing management application 220 from the synchronization module 924 may include a command to synchronize the commerce system 920 with the updates received from the client application 910.

The listing management application 220 may request and receive data from the listing database 126 via the database server 124. Such data may include updated user listing data records to be communicated to the client application in a download synchronization operation 428 (see FIG. 4). The listing management application 220 may send listing update data to API server 114 and to the database server 124. The synchronization module 924 configures synchronization process by receiving timing data specifying the start of the synchronization (e.g., scheduled timing information related to such synchronization to be performed in the future) from the API server 114 and accordingly sending proper commands to the listing management application 220 to start synchronization.

The API server 114 may provide the client system 910 with a programmatic access to the commerce system 920, via the network 104. The API server 114 may receive the user listing data uploaded by the client system 910 and may transfer the data to the listing management application 220. This data may include new listings with their attributes (e.g., price, quantity, specification, start time, end time, etc.), any modification on the previous listings such as change in certain attributes such as end time, if the listing is active, and in case the listing is not yet active, change in any other attributes or even withdrawal of the listing from sale The API server 114 may also receive listing update data from the listing management application 220, and communicate them, via the network 104, to the client system 910. The API server 114 may transfer the user listing data received from the client system 910 to the listing management application 220. It may also transfer synchronization commands or timing data related to start of synchronization process to be performed in the future, received from the client system 920, to the synchronization module 924.

The database server 124 may facilitate access to the listing database(s) 126. In the context of the example commerce system representation 920, the database server 120 is coupled to the listing management application 220 and, therefore, facilitates storage into the listing database 126 of data received from the listing management application 220, and also retrieval of the data needed by the listing management application 220 from the listing database 126.

User Interfaces

Figure 11:
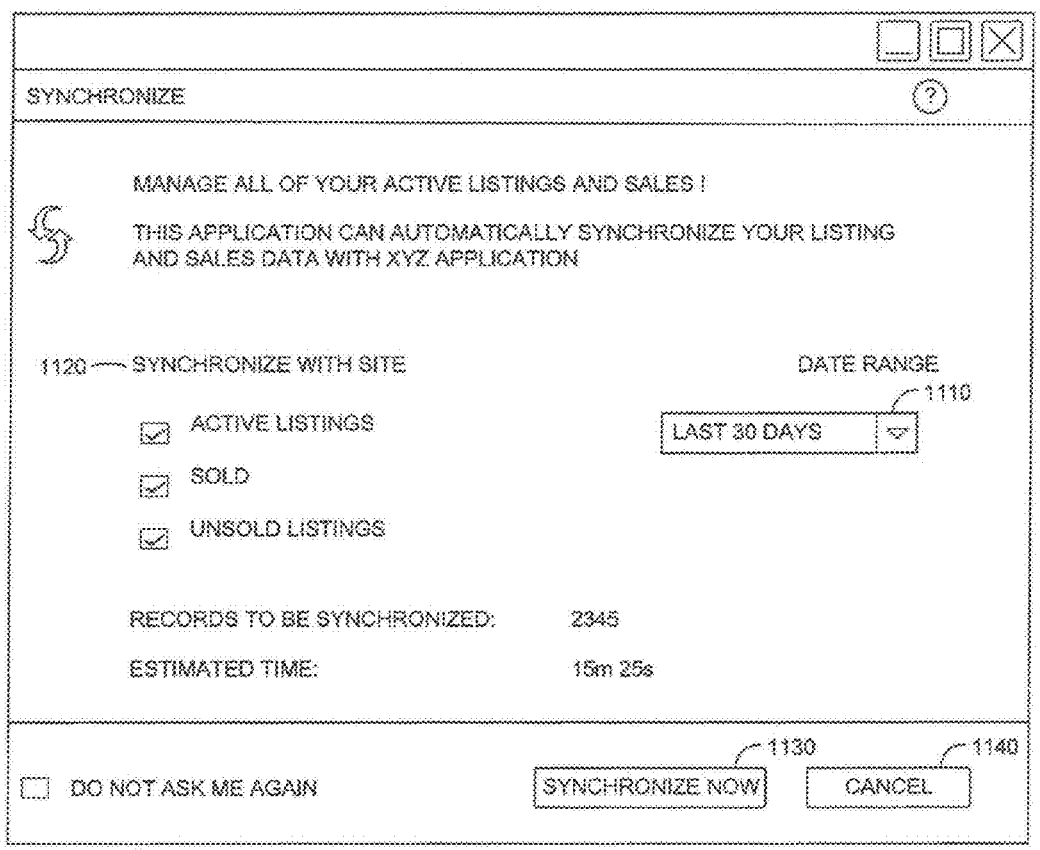
FIG. 11 is a screen shot illustrating an example embodiment of an initial synchronization dialog box.

FIG. 11 is a screen shot, illustrating of an example embodiment of an initial synchronization dialog box 1100. If no initial synchronization has taken place at the time the user uploads first listings to the site, the client application 410 may prompt the user to ask whether the user wants to synchronize listing activities. The user may change the settings for the synchronization by using the dialog box 1100, which is presented to the user after clicking Tools and then Options & Preferences in the client application main window. In the dialog box 1100, check box controls under Synchronize with Site (item 1120) are provided for the user to select the type of items desired to synchronize with the commerce system site. The default is to have the Active Listings and Unsold listings checkboxes checked. The date range drop down menu 1110 allows the user to select the desired date range to retrieve listings. In the example shown, the selected "last 30 days" may indicate that the user wants to include in the synchronization process the listing data (e.g., active listing, sold, or unsold listings as shown under 1120) created within last 30 days.

Transaction synchronization from the client system 910 to the commerce system 920 (e.g., synchronizing revised listings in the client system 910 to the listings listed on the site) may take place using three different methods. These methods may include: 1) Real time (synchronize now (e.g., as soon as change is made to the listing data); 2) Scheduled (e.g., automatically synchronize the changed listings every 2 hours); 3) On-demand (e.g., the user will let the system know when to synchronize).

Figure 12:
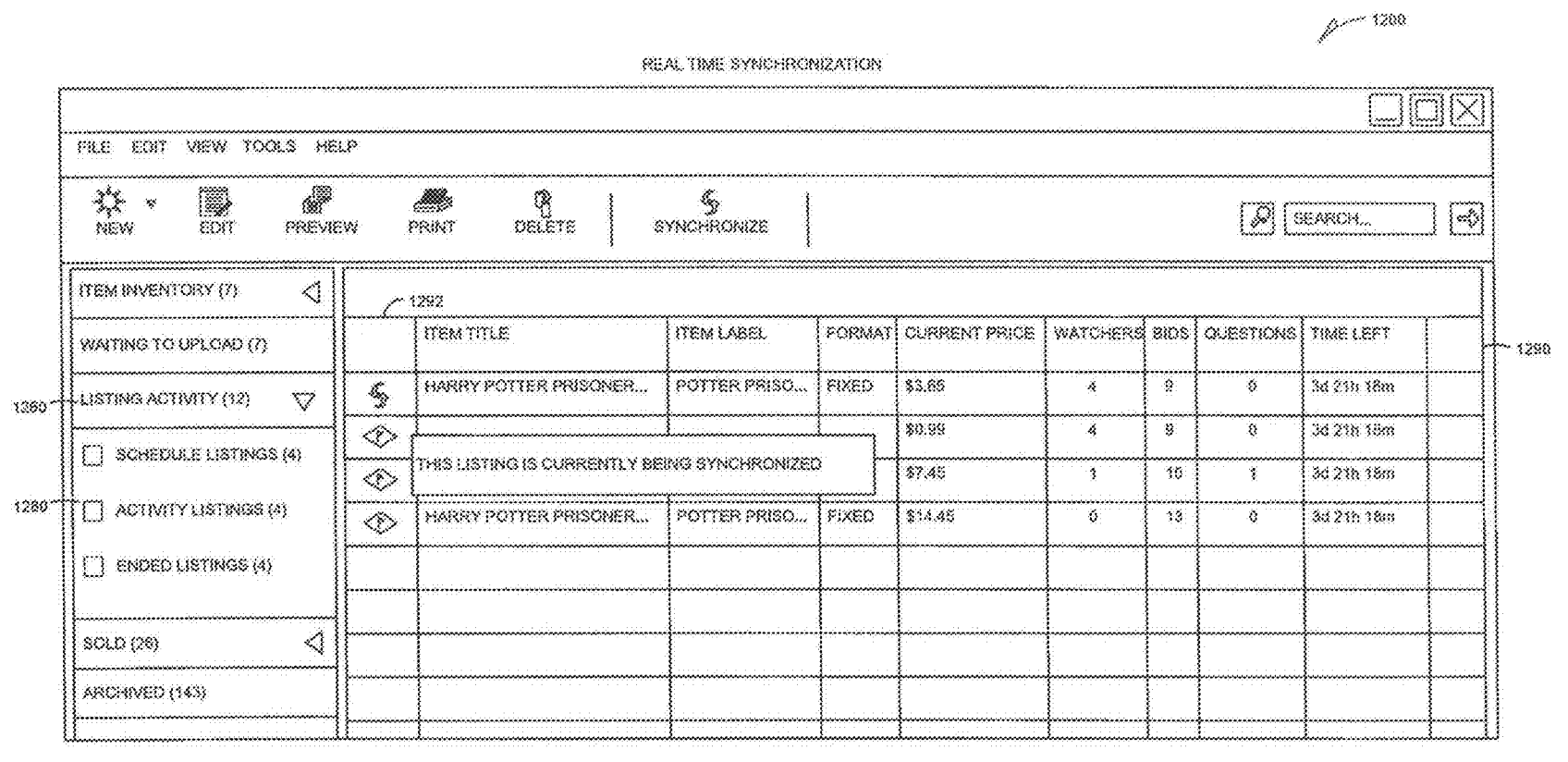

FIG. 12 is a screen shot, illustrating in an example embodiment, an active listings view 1200 of a client application window related to real time synchronization. The real time synchronization may occur at any time that the user edits a listing or sales records. To see the view 1200, the user may click on the Active Listing item 1280 under the Listing Activity knob 1260. In this view, a grid 1290 may show the Active Listing Attributes such as: Title, Label, Format, Price, etc. During the real time synchronization, in the status column 1292, an icon may appear next to the item currently synchronized. The icon contains the tooltip that reads "This listing is currently being synchronized".

Figure 14:
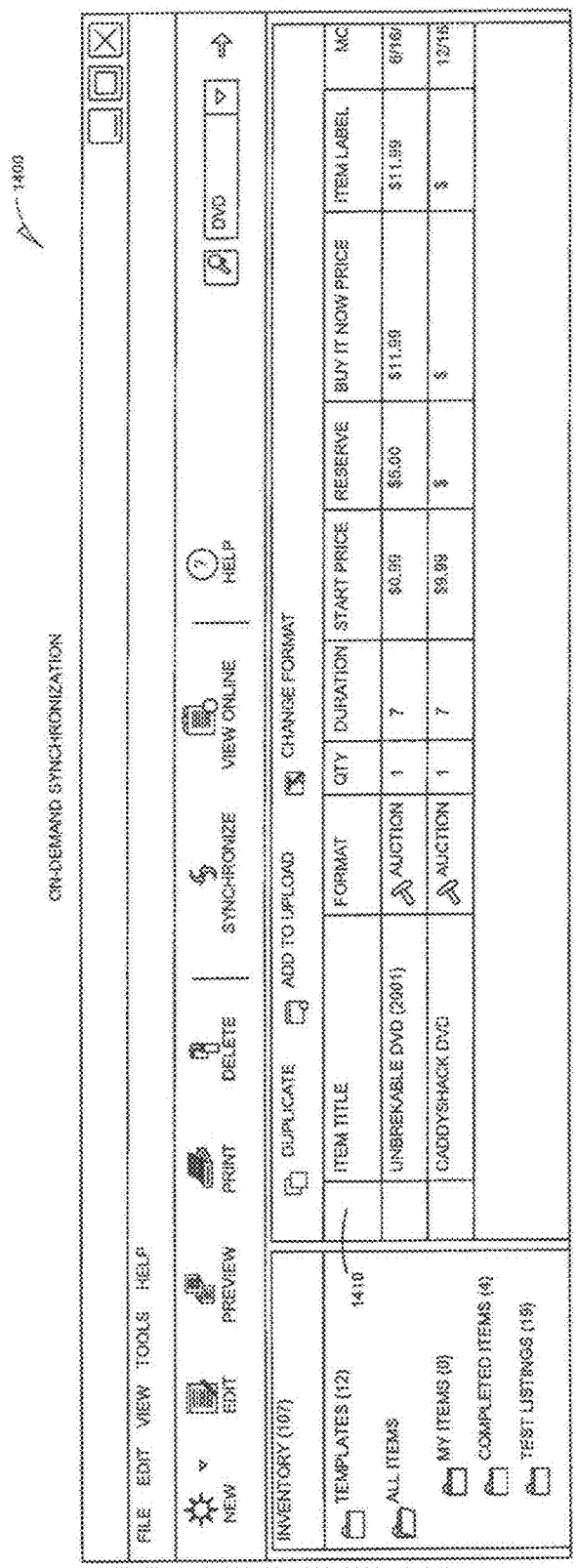
FIG. 14 is a screen shot illustrating an example view of a synchronize toolbar of a client application window.

FIG. 13 is a screen shot, illustrating in an example embodiment, an Active Listings view 1300 of a client application window related to scheduled synchronization. The scheduled synchronization batches all pending revisions and synchronizes them to the site upon the synchronization schedule specified by the user, in user's "Personal Information" shown on "Options and Preferences" dialog-box 1500 (see FIG. 15). To see the view 1300, the user may click on the Active Listing item 1280. In the status column an icon with letter "P" next to a listing may indicate that the listing is in a pending revision state. The icon has a mouse-over that shows a tooltip that reads "The listing has pending revisions". After the synchronization at the scheduled time, the icon will be removed FIG. 14 is a screen shot, illustrating in an example embodiment, a view 1400 of a synchronize toolbar of a client application window. On-Demand synchronization batches all pending revisions and synchronizes them to the site when the user decides to synchronize with the site. Before performing on-demand synchronization, the user has configured the client application 410 so that the synchronization occurs on demand. The user may open an "Active Listing" view 1300 and revise any of the listings under pending revision status, as desired, and press the synchronize button 1320 to synchronize the selected revised listings with the site. When the synchronization is performed, the icons may be removed from the status column 1410.

Figure 15:
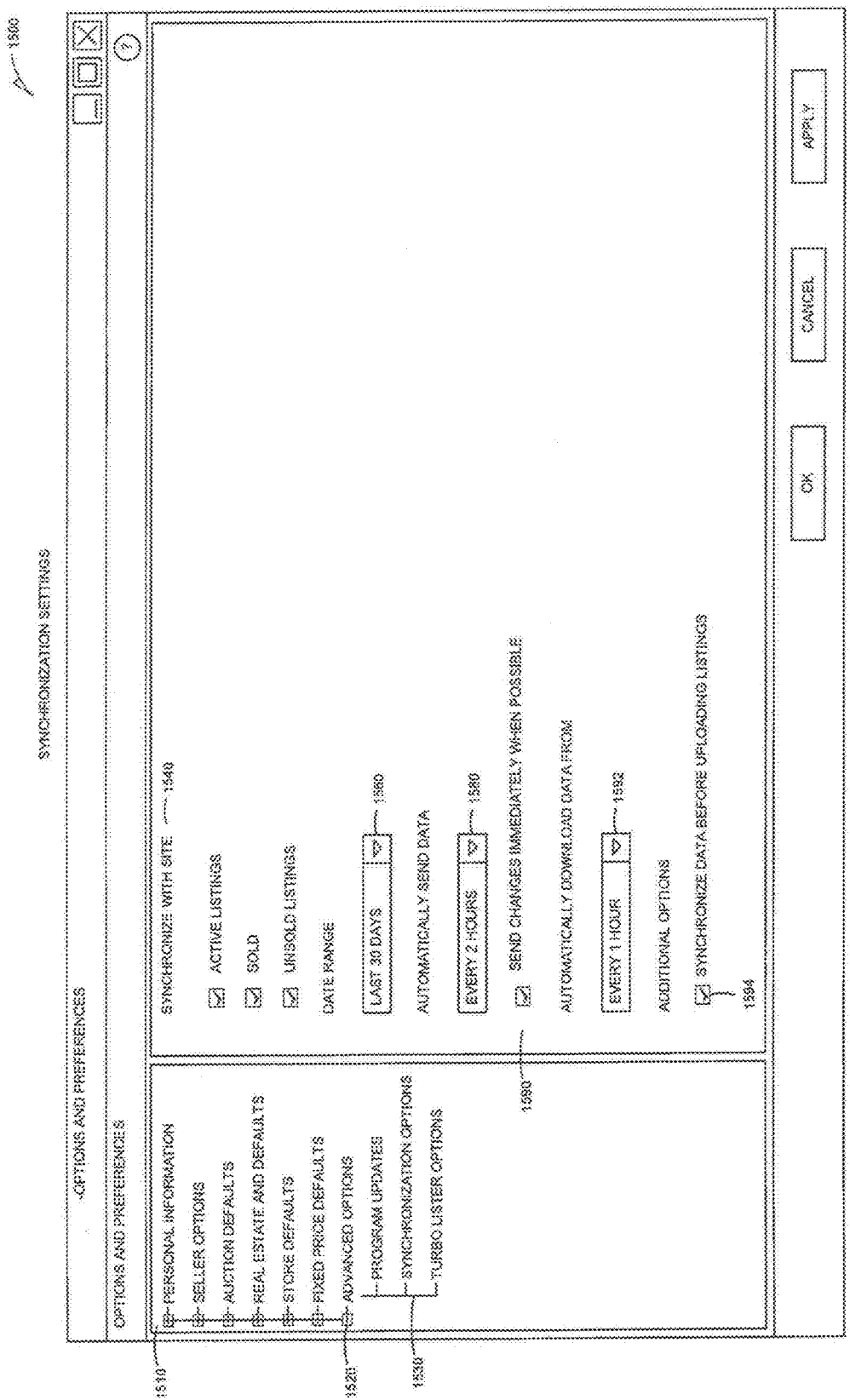
FIG. 15 is a screen shot illustrating in an example view of an options and preferences dialog-box.

FIG. 15 is a screen shot, illustrating in an example embodiment, a view 1500 of an "Options and Preferences" dialog-box. The user may click the "Synchronization Options" selection 1530 from the "Advanced Options" item 1520 of the selection list window 1510. In the dialog box 1500, check box controls under "Synchronize with Site" (item 1540) are provided for the user to select the type of items desired to synchronize with the commerce system site. The default is to have the "Active Listings" and "Unsold listings" checkboxes checked.

The "Date Range" pull down window 1560 allows the user to select the desired date range to retrieve listings. In the example shown, the selected "last 30 days" may indicate that the user wants to include in the synchronization process the listing data (e.g., active listing, sold, or unsold listings as shown under 1120) created within last 30 days.

The "Automatically Send Data" pull down window 1580 allows the user to select the time intervals for the scheduled synchronization with the site. The dialog-box also provides for options on synchronization from the site to the client application. The "Automatically Download Data" pull down window 1592 allows the user to select the time intervals for the synchronization from the site to the client application. Another checkbox 1594 provides the user with an additional option to synchronize data before uploading listings.

Figure 16:
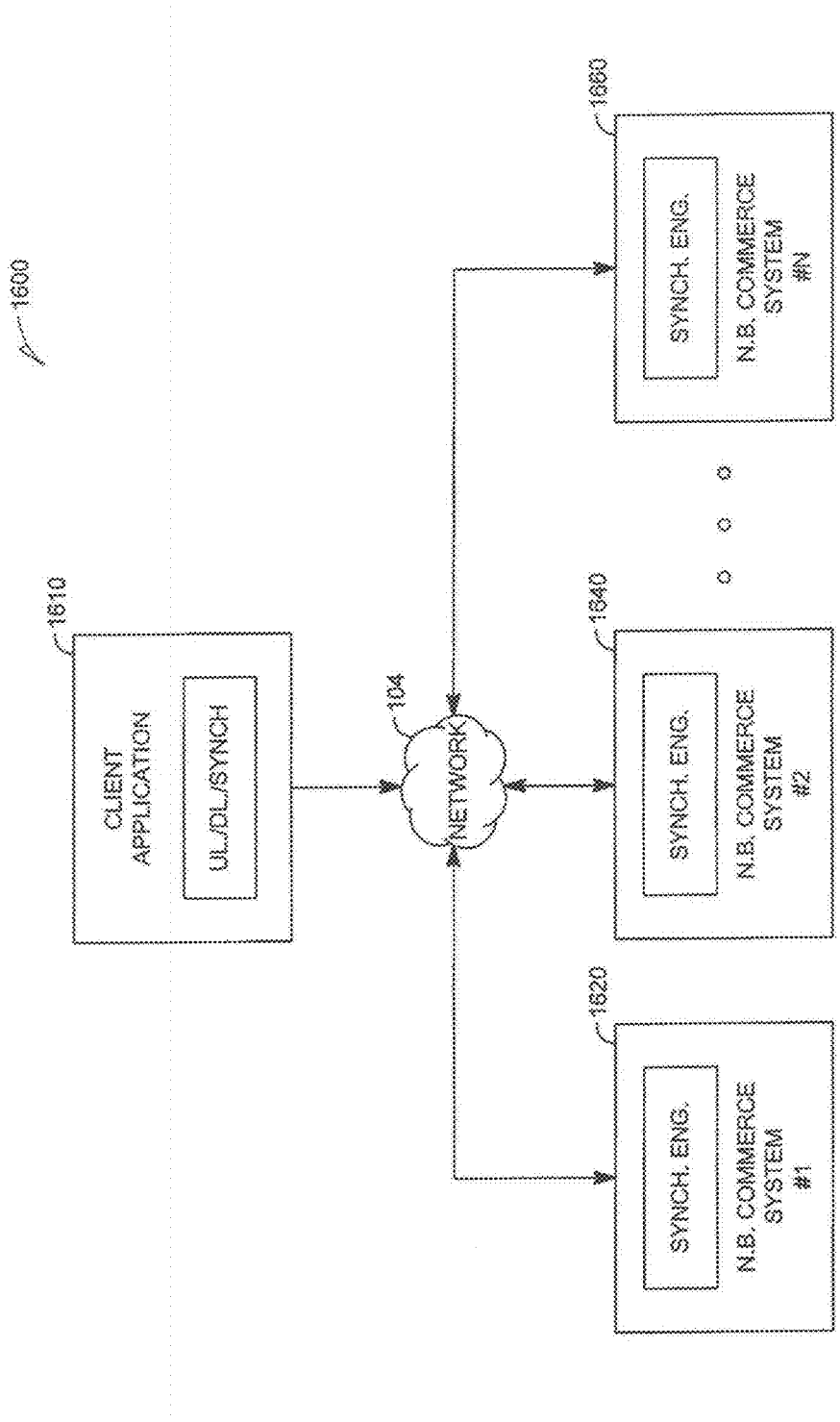
FIG. 16 is a block diagram illustrating an example embodiment of synchronization between a client and a plurality of commerce systems.

FIG. 16 is a block diagram illustrating an example embodiment of synchronization between a client and a plurality of commerce systems 1600. In this example embodiment, a client application 1610 may communicate (e.g., download updates from the sites or upload data to the sites), via the network 104 with a plurality of commerce systems (e.g., 1620, 1640, and 1660). The client application 1610 may synchronize itself to either of the commerce systems, or conversely, synchronize the commerce systems to the client application 1610. The synchronization of the commerce system to the client application 1610 may take place using any of the methods described above (e.g., Real time, Scheduled, or On-demand). The specifics of each method would be as previously described. It is appreciated that in the present case of multiple commerce system synchronization, the client application 1610 may provide the user with an option to specify to (from) which commerce system, the client application 1610 want to synchronize.

In an example embodiment a client application 1610 may have listings published in more than one commerce systems (e.g., 1620, 1640, and 1650). If an item form the listings is sold on one of the commerce systems, e.g. 1620, then the other systems (e.g., 1640 and 1650) have to synchronize with commerce system 1620 in updating their listings by withdrawing that item from the listings associated with the user.

In another example embodiment, when bidding on a listing in a commerce system 1620 reaches a specific level, that bidding may be propagated, by the synchronization process, throughout the entire commerce systems (e.g., 1640 and 1650) in which that listing was published.

Data Structures

Figure 17:
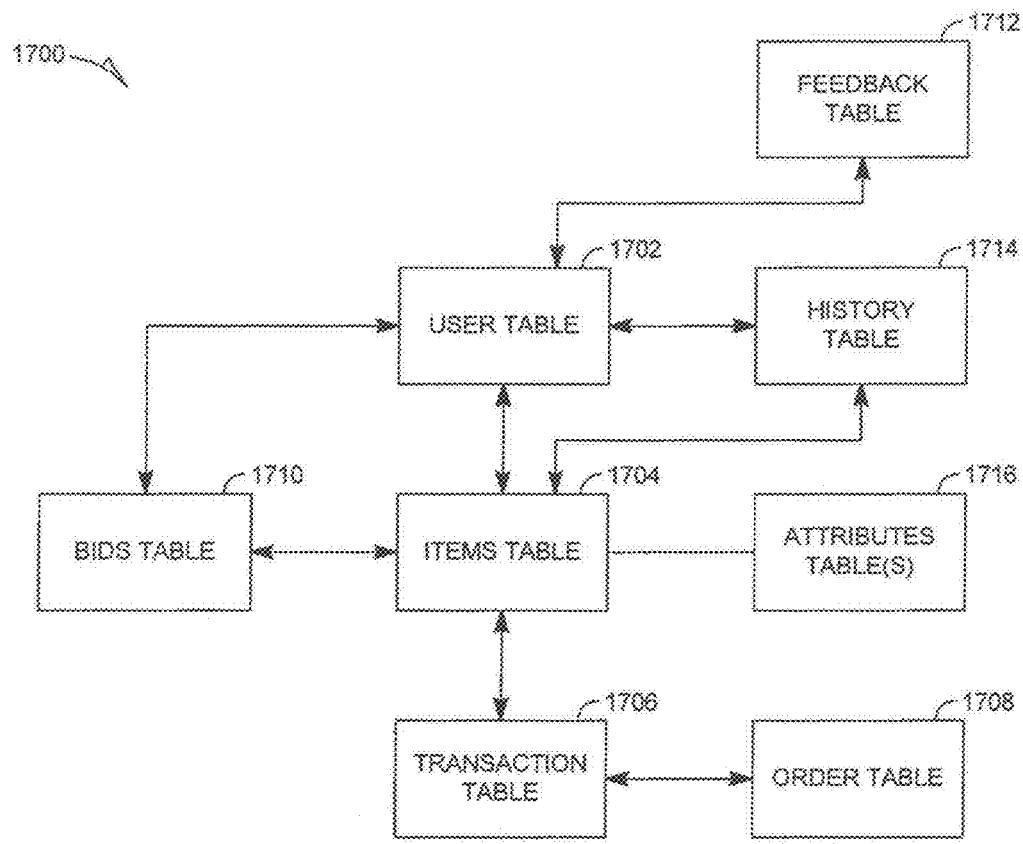
FIG. 17 is a high-level entity-relationship diagram illustrating various tables maintained within the databases.

FIG. 17 is a high-level entity-relationship diagram illustrating various tables 1700 that may be maintained within the databases 126 (see FIG. 1), and that are utilized by and support the applications 120 and 122 (see FIG. 1). A user table 1702 may contain a record for each registered user of the networked system 102 (see FIG. 1), and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 1700 also may include an items table 1704 in which may be maintained item records for goods and services that are available to be, or have been, transacted via the networked system 102. Each item record within the items table 1704 may furthermore be linked to one or more user records within the user table 1702, so as to associate a seller and one or more actual or potential buyers with each item record.

A transaction table 1706 may contain a record for each transaction (e.g., a purchase or sale transaction) pertaining to items for which records exist within the items table 1704.

An order table 1708 may be populated with order records, each order record being associated with an order. Each order, in turn, may be with respect to one or more transactions for which records exist within the transaction table 1706.

Bid records within a bids table 1710 each may relate to a bid received at the networked system 102 in connection with an auction-format listing supported by an auction application 202 (see FIG. 2). A feedback table 1712 may be utilized by one or more reputation applications 208, in one example embodiment, to construct and maintain reputation information concerning users. A history table 1714 may maintain a history of transactions to which a user has been a party. One or more attributes tables 1716 may record attribute information pertaining to items for which records exist within the items table 1704. Considering only a single example of such an attribute, the attributes tables 1716 may indicate a currency attribute associated with a particular item, the currency attribute identifying the currency of a price for the relevant item as specified in by a seller.

Machine Architecture

Figure 18:
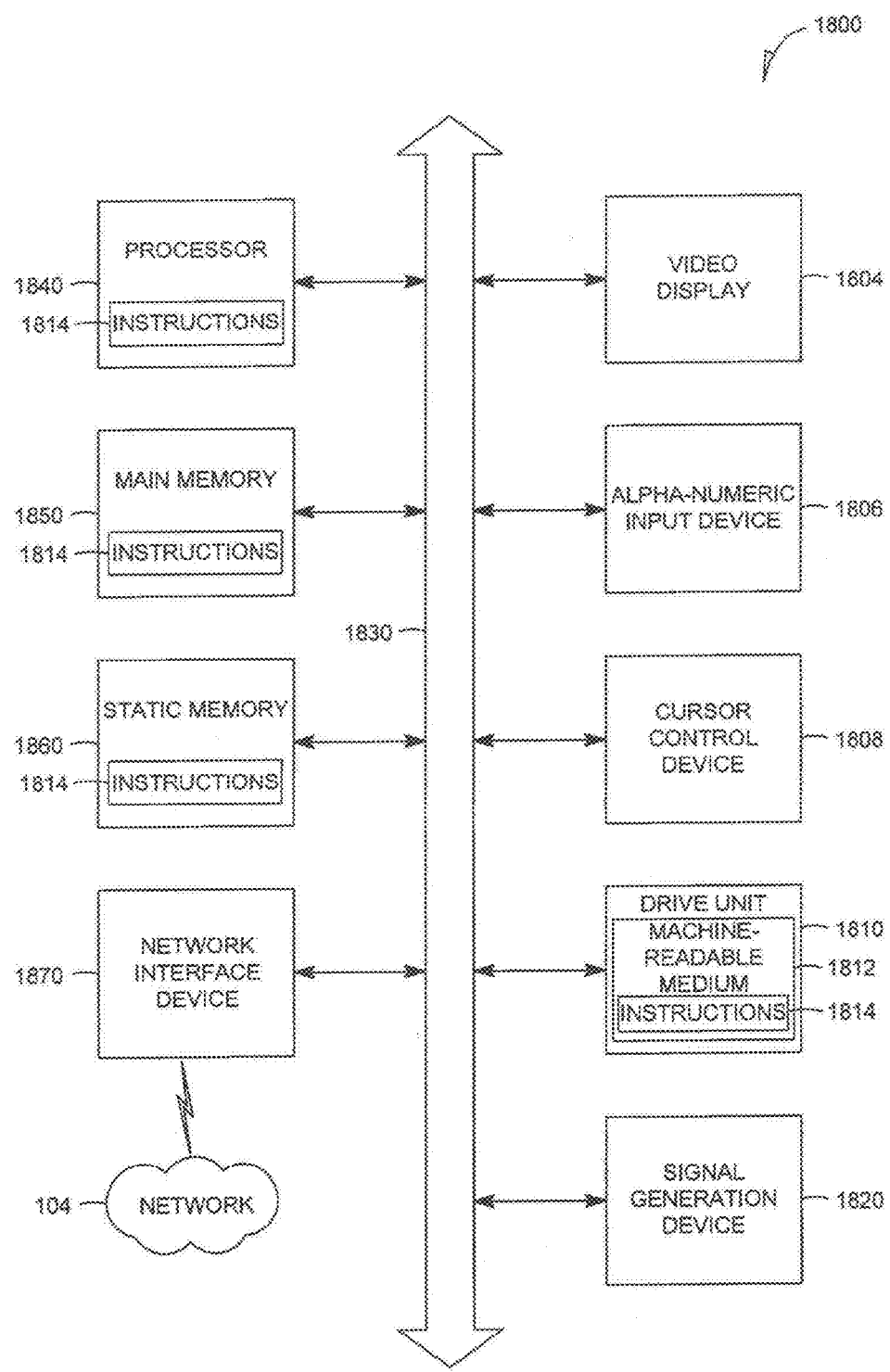
FIG. 18 is a block diagram illustrating a diagrammatic representation of a machine in the example form of a computer system.

FIG. 18 is a block diagram, illustrating a diagrammatic representation of machine 1800 in the example form of a computer system within which a set of instructions, for causing the machine to perform any one or more of the methodologies discussed herein, may be executed. In alternative embodiments, the machine may operate as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 may include a processor 1840 (e.g., a central processing unit (CPU) a graphics processing unit (GPU) or both), a main memory 1850 and a static memory 1860, which communicate with each other via a bus 1830. The computer system 1800 may further include a video display unit 1804 (e.g., liquid crystal displays (LCD) or cathode ray tube (CRT)). The computer system 1800 also may include an alphanumeric input device 1806 (e.g., a keyboard), a cursor control device 1808 (e.g., a mouse), a disk drive unit 1810, a signal generation device 1820 (e.g., a speaker) and a network interface device 1870.

The disk drive unit 1810 may include a machine-readable medium 1812 on which is stored one or more sets of instructions (e.g., software 1814) embodying any one or more of the methodologies or functions described herein. The software 1814 may also reside, completely or at least partially, within the main memory 1850 and/or within the processor 1840 during execution thereof by the computer system 1800, the main memory 1850 and the processor 1840 also constituting machine-readable media.

The software 1814 may further be transmitted or received over a network 426 via the network interface device 1870.

While the machine-readable medium 1812 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and system to synchronize the data between a commerce system and a client application or between a client application and multiple commerce systems have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    opening a plurality of a number of network connections between a client machine and a plurality of network-based commerce systems, each of the plurality of the number of network connections determined by a client application locally installed on the client machine, each of the plurality of the number of network connections based on a machine census of the client machine, the machine census including determining a central processing power, total memory, available memory, operating system, and bandwidth of the client machine, each of the plurality of the number of network connections dynamically assigned to one of a plurality of synchronization jobs;
    using each of the plurality of the number of network connections to perform the plurality of synchronization jobs, each of the plurality of synchronization jobs synchronizing data between the client application and one of the plurality of network-based commerce systems, the opening and synchronizing being performed by one or more modules incorporated into the client machine to specially-configure the client machine to perform the opening and synchronizing, the one or modules implemented by one or more processors of the client machine; and
    displaying a first user interface element and a second user interface element in a user interface of the client application, the first user interface element identifying a portion of the data, the second user interface element indicating a current status of the synchronizing of the portion of the data, the displaying of the second user interface element triggered by an action performed by a user of the client device during the synchronizing of the data.

2. The method of claim 1, wherein the data includes a record corresponding to a user listing on the network-based commerce system.

3. The method of claim 1, wherein the synchronizing allows a selling manager to view a change to the record within an instance of the client application as the change is made remotely by an agent of the selling manager from within an additional instance of the client application.

4. The method of claim 1, further comprising generating a synchronization process indicator for display within the client application while the synchronizing is occurring.

5. The method of claim 1, wherein the synchronizing of the data is performed in real time, according to a schedule, or on demand based on preferences of a user of the client application.

6. The method of claim 1, further comprising generating a notification of an estimated amount of time it will take to synchronize the record, the estimated time based on the number of records.

7. The method of claim 1, wherein the portion of the data corresponds to a listing of an item that is currently being synchronized.

8. The method of claim 1, wherein the user-performed action is a mouse-over of the portion of the data that is currently being synchronized.

9. A system comprising:
one or more modules implemented by one or more processors of a client machine, the one or more modules incorporated into the client machine to specially-configure the client machine to, at least:
open a plurality of a number of network connections between the client machine and a plurality of network-based commerce systems, each of the plurality of the number of network connections determined by a client application locally installed on the client machine, each of the plurality of the number of network connections based on a machine census of the client machine, the machine census including determining a central processing power, total memory, available memory, operating system, and bandwidth of the client machine each of the plurality of the number of network connections dynamically assigned to one of a plurality synchronization jobs;
use each of the plurality of the number of network connections to perform the plurality of synchronization jobs, each of the plurality of synchronization jobs synchronizing data between the client application and one of the plurality of network-based commerce systems; and
display a first user interface element and a second user interface element in a user interface of the client application, the first user interface element identifying a portion of the data, the second user interface element indicating a current status of the synchronizing of the portion of the data, the display of the second user interface element triggered by an action performed by a user of the client device during the synchronizing of the data.

10. The system of claim 9, wherein the data includes a record corresponding to a user listing on the network-based commerce system.

11. The system of claim 9, wherein the synchronizing allows a selling manager to view a change to the record within an instance of the client application as the change is made remotely by an agent of the selling manager from within an additional instance of the client application.

12. The system of claim 9, the one or more modules to specially-configure the client machine further to generate a synchronization process indicator for display within the client application while the synchronizing is occurring.

13. The system of claim 9, wherein the synchronizing of the data is performed in real time, according to a schedule, or on demand based on preferences of a user of the client application.

14. The system of claim 9, the one or more modules to specially-configure the client machine further to generate a notification of an estimated amount of time it will take to synchronize the record, the estimated time based on the number of records.

15. A non-transitory machine-readable medium embodying a set of instructions that, when executed by at least one processor of a client machine, causes the processor to perform operations comprising:
opening a plurality of a number of network connections between the client machine and a plurality of network-based commerce systems, each of the plurality of the number of network connections determined by a client application locally installed on the client machine, each of the plurality of the number of network connections based on a machine census of the client machine, the machine census including determining a central processing power, total memory, available memory, operating system, and bandwidth of the client machine, each of the plurality of the number of network connections dynamically assigned to one of a plurality of synchronization jobs;
using each of the plurality of the number of network connections to perform the plurality of synchronization jobs, each of the plurality of synchronization jobs synchronizing data between the client application and one of the plurality of network-based commerce systems; and
displaying a first user interface element and a second user interface element in a user interface of the client application, the first user interface element identifying a portion of the data, the second user interface element indicating a current status of the synchronizing of the portion of the data, the displaying of the second user interface element triggered by an action performed by a user of the client device during the synchronizing of the data.

16. The non-transitory machine-readable medium of claim 15, wherein the data includes a record corresponding to a user listing on the network-based commerce system.

17. The non-transitory machine-readable medium of claim 15, wherein the synchronizing allows a selling manager to view a change to the record within an instance of the client application as the change is made remotely by an agent of the selling manager from within an additional instance of the client application.

18. The non-transitory machine-readable medium of claim 15, further comprising generating a synchronization process indicator for display within the client application while the synchronizing is occurring.

19. The non-transitory machine-readable medium of claim 15, wherein the synchronizing of the data is performed in real time, according to a schedule, or on demand based on preferences of a user of the client application.

* * * * *

UNITED STATES PATENT AND TRADEMARK OFFICE
CERTIFICATE OF CORRECTION

PATENT NO. : 9,904,945 B2
APPLICATION NO. : 14/445381
DATED : February 27, 2018
INVENTOR(S) : Allen Yihren Liu et al.

Page 1 of 1

It is certified that error appears in the above-identified patent and that said Letters Patent is hereby corrected as shown below:

In the Claims

In Column 17, Line 46, in Claim 9, delete "machine" and insert -- machine, --, therefor.

In Column 17, Line 48, in Claim 9, delete "plurality" and insert -- plurality of --, therefor.

Signed and Sealed this
First Day of May, 2018

Andrei Iancu
*Director of the United States Patent and Trademark Office*